United States Patent
Park

(10) Patent No.: US 9,769,717 B2
(45) Date of Patent: Sep. 19, 2017

(54) METHOD AND APPARATUS FOR OPERATING SYSTEM IN CELLULAR MOBILE COMMUNICATION SYSTEM

(71) Applicant: ELECTRONICS AND TELECOMMUNICATIONS RESEARCH INSTITUTE, Daejeon (KR)

(72) Inventor: SoonGi Park, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 102 days.

(21) Appl. No.: 14/973,795

(22) Filed: Dec. 18, 2015

(65) Prior Publication Data

US 2016/0183233 A1 Jun. 23, 2016

(30) Foreign Application Priority Data

Dec. 19, 2014 (KR) .......................... 10-2014-0184925

(51) Int. Cl.
*H04W 72/04* (2009.01)
*H04W 36/00* (2009.01)
(Continued)

(52) U.S. Cl.
CPC ...... *H04W 36/0072* (2013.01); *H04B 7/0408* (2013.01); *H04W 16/30* (2013.01); *H04W 36/0066* (2013.01)

(58) Field of Classification Search
CPC .................................................. H04W 36/0072
See application file for complete search history.

(56) References Cited

U.S. PATENT DOCUMENTS 7,002,470 B1 * 2/2006 Miao .................... G08B 25/009
340/539.1
8,750,345 B1 * 6/2014 Krivokapic .......... H04B 1/7163
375/130

(Continued)

FOREIGN PATENT DOCUMENTS

KR 10-2011-0129951 A 12/2011
KR 10-2013-0029204 A 3/2013

(Continued)

OTHER PUBLICATIONS

Soon-Gi Park et al., "Design and Capacity Evaluation of New mmWave-based Multi-Spot Beam Cellular System", 2014 8th International Conference on Future Generation Communication and Networking, Dec. 20, 2014 to Dec. 23, 2014.

(Continued)

*Primary Examiner* — Parth Patel
(74) *Attorney, Agent, or Firm* — Rabin & Berdo, P.C.

(57) ABSTRACT

A base station including a plurality of antenna assemblies in a mobile communication system divides an ultra wideband into a plurality of unit-bands (UBs), forms a plurality of beams by the plurality of antenna assemblies, groups a plurality of beam component carriers distinguished by the plurality of UBs into beam component carriers that belong to the same UB to operate the grouped beam component carriers as a plurality of cells, and configures one cell among the plurality of cells as a cell for movement of a terminal.

18 Claims, 31 Drawing Sheets

(51) Int. Cl.
*H04W 16/30* (2009.01)
*H04B 7/0408* (2017.01)

(56) References Cited

U.S. PATENT DOCUMENTS

| | | | |
|---|---|---|---|
| 9,609,672 B2* | 3/2017 | Park | H04W 76/02 |
| 2005/0053121 A1* | 3/2005 | Lakkis | H04L 1/06 |
| | | | 375/130 |
| 2005/0058151 A1* | 3/2005 | Yeh | H04W 52/46 |
| | | | 370/445 |
| 2005/0113045 A1* | 5/2005 | Santhoff | H04B 1/7176 |
| | | | 455/130 |
| 2005/0195883 A1* | 9/2005 | Choi | H04B 1/7176 |
| | | | 375/130 |
| 2005/0255878 A1* | 11/2005 | Leinonen | H04B 1/005 |
| | | | 455/552.1 |
| 2006/0039272 A1* | 2/2006 | Sikri | H04B 1/71635 |
| | | | 370/208 |
| 2007/0054682 A1* | 3/2007 | Fanning | H04L 27/2608 |
| | | | 455/509 |
| 2007/0091983 A1* | 4/2007 | Siriwongpairat | H04B 1/71632 |
| | | | 375/130 |
| 2007/0178930 A1* | 8/2007 | Xiao | H04W 52/346 |
| | | | 455/522 |
| 2007/0230594 A1* | 10/2007 | Mo | H04L 1/04 |
| | | | 375/260 |
| 2007/0258540 A1* | 11/2007 | Ratasuk | H04J 11/005 |
| | | | 375/267 |
| 2008/0233966 A1* | 9/2008 | Scheim | H04L 5/0023 |
| | | | 455/452.1 |
| 2009/0186658 A1* | 7/2009 | Jiang | H01Q 21/061 |
| | | | 455/562.1 |
| 2009/0243940 A1* | 10/2009 | Humphrey | H01Q 1/2283 |
| | | | 343/700 MS |
| 2009/0290555 A1* | 11/2009 | Alpert | H04W 4/20 |
| | | | 370/331 |
| 2010/0303039 A1 | 12/2010 | Zhang et al. | |
| 2010/0329247 A1* | 12/2010 | Kennedy | H04B 7/163 |
| | | | 370/389 |
| 2011/0149929 A1* | 6/2011 | Kleider | H04L 5/0023 |
| | | | 370/338 |
| 2011/0299488 A1* | 12/2011 | Kim | H04W 16/16 |
| | | | 370/329 |
| 2012/0082130 A1* | 4/2012 | Xue | H04L 5/001 |
| | | | 370/330 |
| 2012/0269234 A1* | 10/2012 | Zhang | H04L 5/0007 |
| | | | 375/143 |
| 2013/0065622 A1* | 3/2013 | Hwang | H04W 16/28 |
| | | | 455/500 |
| 2013/0094467 A1* | 4/2013 | Kwon | H04L 5/001 |
| | | | 370/329 |
| 2013/0107862 A1 | 5/2013 | Yang et al. | |
| 2013/0114531 A1* | 5/2013 | Ahn | H04W 72/04 |
| | | | 370/329 |
| 2013/0121185 A1 | 5/2013 | Li et al. | |
| 2013/0235851 A1 | 9/2013 | Abu-Surra et al. | |
| 2013/0237218 A1 | 9/2013 | Li et al. | |
| 2013/0301454 A1 | 11/2013 | Seol et al. | |
| 2013/0301455 A1 | 11/2013 | Jung | |
| 2013/0310024 A1 | 11/2013 | Jung | |
| 2014/0004869 A1 | 1/2014 | Jung | |
| 2014/0043955 A1 | 2/2014 | Ko et al. | |
| 2014/0120926 A1 | 5/2014 | Shin et al. | |
| 2015/0009880 A1 | 1/2015 | Zhang et al. | |
| 2015/0195015 A1 | 7/2015 | Kim et al. | |
| 2016/0183230 A1* | 6/2016 | Park | H04W 76/02 |
| | | | 455/452.2 |
| 2016/0183233 A1* | 6/2016 | Park | H04W 16/30 |
| | | | 370/331 |
| 2016/0323015 A1* | 11/2016 | Henry | H04B 3/542 |

FOREIGN PATENT DOCUMENTS

| | | |
|---|---|---|
| KR | 10-2013-0052670 A | 5/2013 |
| KR | 10-2013-0103443 A | 9/2013 |
| KR | 10-2013-0127192 A | 11/2013 |
| KR | 10-2013-0127376 A | 11/2013 |
| KR | 10-2013-0129686 A | 11/2013 |
| KR | 10-2014-0002403 A | 1/2014 |
| KR | 10-2014-0012240 A | 2/2014 |

OTHER PUBLICATIONS

Soon-Gi Park et al., "Novel Cellular System Design using Stand-alone and Centralized mmWave-based Multi-Spot Beam Structure", International Journal of Control and Automation, vol. 8, No. 2, Feb. 2015, pp. 337-350.

* cited by examiner

FIG. 11A
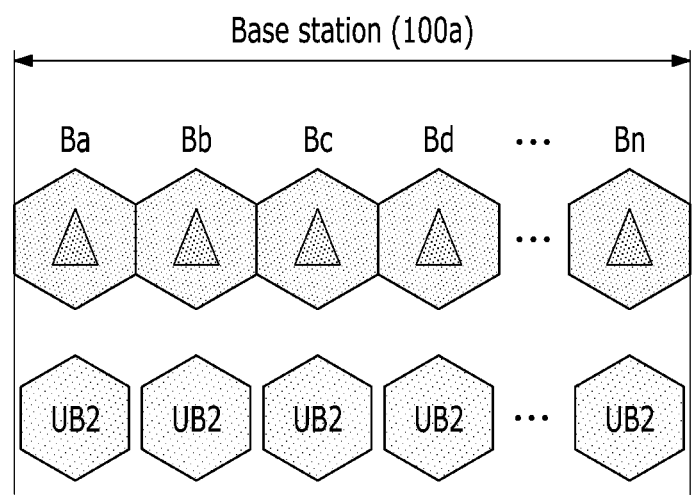
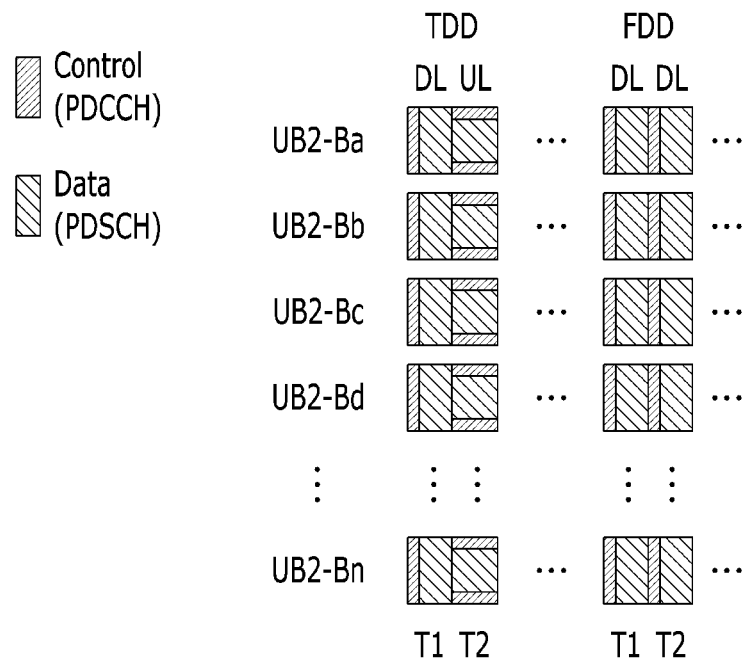

METHOD AND APPARATUS FOR OPERATING SYSTEM IN CELLULAR MOBILE COMMUNICATION SYSTEM

CROSS-REFERENCE TO RELATED APPLICATION

This application claims priority to and the benefit of Korean Patent Application No. 10-2014-0184925 filed in the Korean Intellectual Property Office on Dec. 19, 2014, the entire contents of which are incorporated herein by reference.

BACKGROUND OF THE INVENTION (a) Field of the Invention

The present invention relates to a method and an apparatus for operating a system in a cellular mobile communication system, and particularly, to an apparatus for operating a system in a cellular mobile communication system using a high-frequency band.

(b) Description of the Related Art

Methods for providing against an explosive increase of mobile traffic in a mobile communication system generally include three types. A first type is to increase spectrum efficiency of a frequency, a second type is to increase used frequencies, and a third type is to compactificate a small cell.

In the case of the second type, since a frequency to be used as the existing cellular frequency is insufficient, development of a new technology for using a high-frequency band (e.g., mmWave) which is not used as mobile communication in the mobile communication system is required. However, when the high frequency is used, attenuation of the high frequency by an obstacle is very much larger as compared with a frequency used in the existing mobile communication, and as a result, it is considered that the high frequency is used for backhaul in a line-of-sight (LOS) environment, but the high frequency has been handled as a frequency which it is difficult to use in a cellular mobile communication system in which communication should be available even in a non-LOS (NLOS) environment.

SUMMARY OF THE INVENTION

The present invention has been made in an effort to provide a method and an apparatus for operating a system in a cellular mobile communication system for operating a frequency resource in a high-frequency band in the cellular mobile communication system.

An exemplary embodiment of the present invention provides a method for operating a system in a base station including a plurality of antenna assemblies in a mobile communication system. The method includes: dividing an ultra wideband into a plurality of unit-bands (UBs); forming a plurality of beams by the plurality of antenna assemblies; grouping a plurality of beam component carriers distinguished by the plurality of UBs into beam component carriers that belong to the same UB with respect to each beam to operate the grouped beam component carriers as a plurality of cells; and configuring one cell among the plurality of cells as a cell for movement of a terminal.

The method may further include allocating the same resource by pairing the beam component carriers based on interference among the beam component carriers that belong to the same UB.

The allocating may include estimating interference based on feedback information from a plurality of terminals and pairing beam component carriers in which the interference does not occur, and the feedback information may include information on a reference signal of a detected beam component carrier.

The configuring may include transmitting a common reference signal through the plurality of beam component carriers constituting each cell, and supporting, when cell handover is determined based on an average value of a received strength measured from the common reference signal by the terminal, the cell handover.

The configuring may include transmitting unique reference signals from the plurality of beam component carriers constituting each cell, respectively, and supporting, when beam switching is determined based on the received strength of the reference signal by the terminal, the beam switching.

The method may further include: transmitting measurement control information associated with beam tracking to the terminal through system information of a cell in which the terminal resides when the terminal is in an idle state; and transmitting the measurement control information through a dedicated channel of an accessed cell when the terminal is in an accessed state, wherein the cell handover or the beam switching may be determined by the terminal based on the beam tracking.

The configuring may include aggregating residual beam component carriers other than a beam component carrier of a cell for movement of the terminal among a plurality of beam component carriers in a beam in which the terminal resides.

The cell for the movement of the terminal may be a cell of the same UB as a neighboring base station or a cell of a different UB from the neighboring base station.

The configuring may include executing advanced resource preparation of at least one neighboring beam corresponding to 1 tier around a beam which the terminal currently accesses in the configured cell.

The configuring may further include changing, by the terminal, a radio access link from a serving beam of the configured cell to a target beam, performing resource release of beams of which advanced resource preparation is not required among beams of which advanced resource preparation is made, and executing the advanced resource preparation of new beams of which advanced resource preparation is required.

The changing may include recovering, by the terminal, a failure of the radio access link to the target beam when the failure is detected in the radio access link with the serving beam.

The recovering may include requesting and receiving context information of the terminal from the neighboring base station when there is no context information of the terminal.

The target beam may be a beam controlled by a base station controlling the serving beam, or may include a beam controlled by a base station different from the base station controlling the serving beam.

The target beam may be the serving beam or may include a different beam from the serving beam.

The configuring may further include transmitting advanced resource preparation information of at least one neighboring beam to the terminal.

Another exemplary embodiment of the present invention provides an apparatus for operating a system in a base station operating a plurality of beam in a mobile communication system. The apparatus includes a processor and a transceiver. The processor divides an ultra wideband into a plurality of unit-bands (UBs), wherein a plurality of beams including a plurality of beam component carriers using the plurality of UBs, groups beam component carriers using the same UB to operate a plurality of UB grouping cells, and supports movement of a terminal by configuring one cell among the plurality of UB grouping cells as a cell for movement of the terminal. In addition, the transceiver transceives signaling for the movement of the terminal with the terminal or an adjacent base station.

The processor may allocate the same resource by pairing beam component carriers which do not interfere with each other among the beam component carriers that belong to the same UB.

The processor may aggregate and operate residual beam component carriers other than a beam component carrier of a cell for movement of the terminal among a plurality of beam component carriers in a beam in which the terminal resides.

The processor may execute advanced resource preparation of at least one neighboring beam corresponding to 1 tier around a beam which the terminal currently accesses in the configured cell, and when the terminal changes a radio access link from a serving beam to a target beam, the processor may perform resource release of beams of which advanced resource preparation is not required among beams of which advanced resource preparation is made, and execute the advanced resource preparation of new beams of which advanced resource preparation is required.

The transceiver may receive a context information request of the terminal from the neighboring base station, and the processor may verify context information of the corresponding terminal and transmit the context information of the corresponding terminal through the transceiver.

BRIEF DESCRIPTION OF THE DRAWINGS

FIGS. 11A and 11B are diagrams illustrating one example of a method for operating a system in terms of resource management for BCCs corresponding to a specific UB according to the exemplary embodiment of the present invention, respectively.

DETAILED DESCRIPTION OF THE EMBODIMENTS

Figure 1:
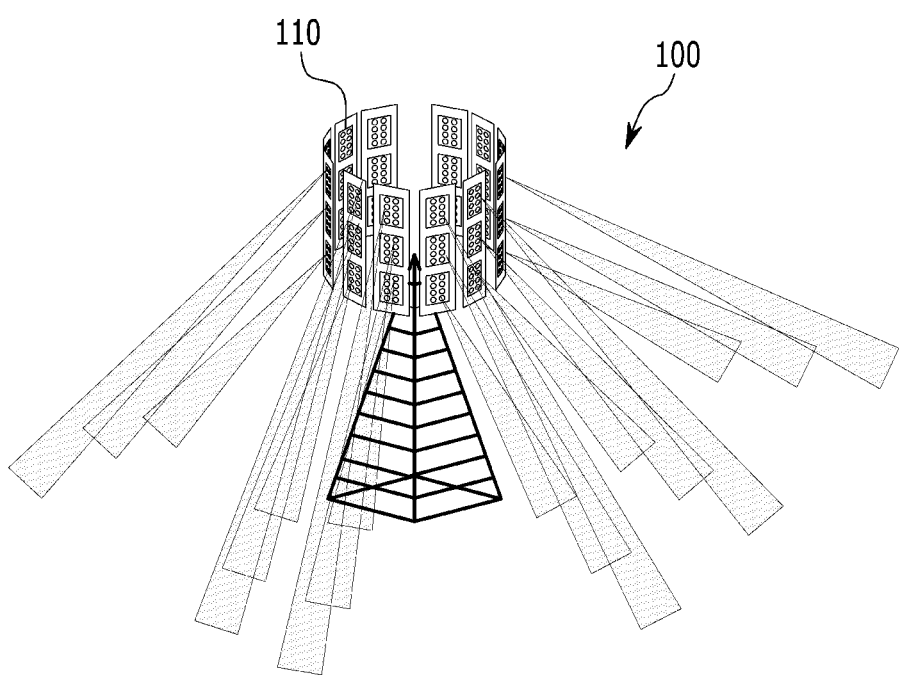
FIG. 1 is a diagram illustrating a base station according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

Throughout the specification, a terminal may be designated as user equipment (UE), a mobile terminal (MT), a mobile station (MS), an advanced mobile station (AMS), a high reliability mobile station (HR-MS), a subscriber station (SS), a portable subscriber station (PSS), an access terminal (AT), and the like, and may include all or some functions of the UE, the MT, the MS, the AMS, the HR-MS, the SS, the PSS, the AT, and the like.

Further, the base station (BS) may designate a node B, an evolved node B (eNB), an advanced base station (ABS), a high reliability base station (HR-BS), an access point (AP), a radio access station (RAS), a base transceiver station (BTS), and the like, and may include all or some functions of the node B, the eNB, the ABS, the HR-BS, the AP, the RAS, the BTS, and the like.

Hereinafter, a method and an apparatus for operating a system in a cellular mobile communication system according to exemplary embodiments of the present invention will be described in detail with reference to the drawings.

FIG. 1 is a diagram illustrating a base station according to an exemplary embodiment of the present invention.

Referring to FIG. 1, a base station 100 includes a plurality of array antenna assemblies 110.

Each array antenna assembly 110 may include a plurality of array antenna modules. The respective array antenna modules may include a plurality of antenna components.

The array antenna assembly 110 may generate beam patterns such as a broadside, an end-fire, and a Chevyshev according to an array and shapes of the plurality of antenna components and power and phase control.

The plurality of array antenna assemblies 110 cooperate with each other to form one beam. One array antenna module in one array antenna assembly 110 may form one beam and one antenna component in the array antenna module may form one beam.

Figure 2:
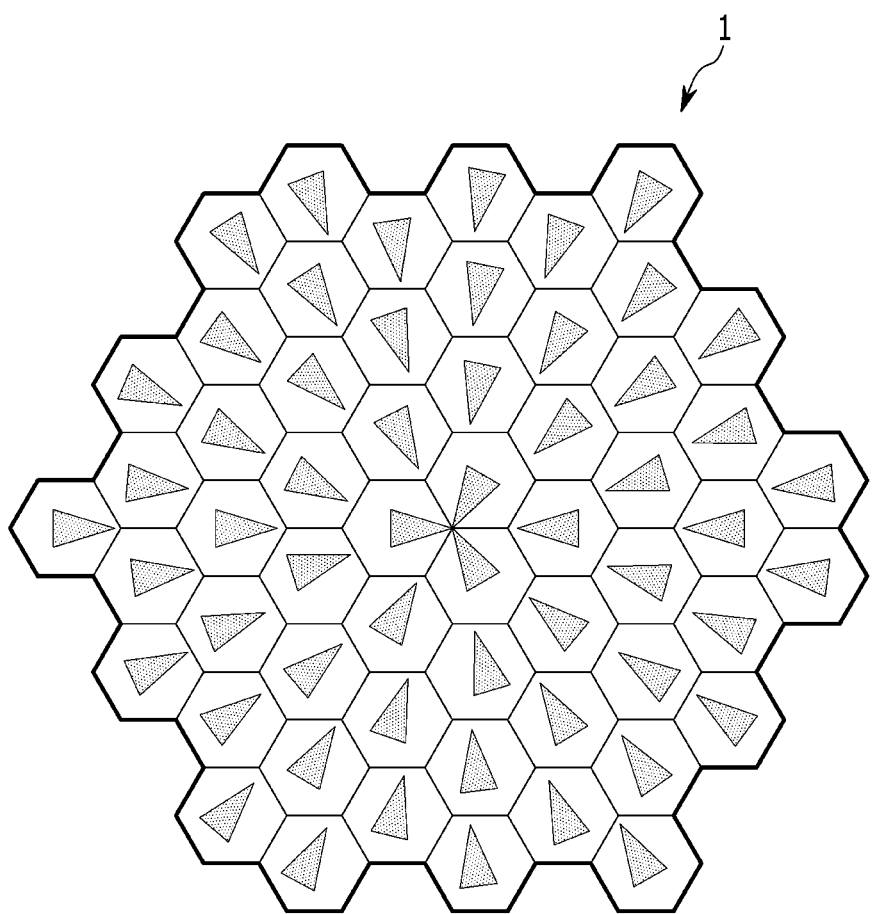
FIG. 2 is a diagram illustrating one example of service coverage of the base station constituted by multiple spot beams formed by multiple array antenna modules mounted on one base station illustrated in FIG. 1.

FIG. 2 is a diagram illustrating one example of service coverage of the base station constituted by multiple spot beams formed by multiple array antenna modules mounted on one base station illustrated in FIG. 1.

As illustrated in FIG. 2, 57 array antenna assemblies 110 of the base station 100 form end-fire beams, respectively, to constitute service coverage 1 of the base station 100. In this case, a beam formed by each array antenna module 112 is referred to as a spot beam and an area covered by the spot beam is referred to as spot beam coverage. That is, the service coverage 1 of the base station 100 may be formed by multiple spot beam coverages.

In FIG. 2, a pattern is illustrated in which a triangle is added into the coverage in order to differentiate one spot beam coverage from the existing cell coverage, and the triangle means spot beam coverage formed by the array antenna assembly 110 from one location of the base station 100. That is, the base station 100 includes 57 array antenna assemblies 110 and generates beams having, for example, an end-fire shape from the respective array antenna assemblies 110 to form 57 spot beam coverages. In addition, 57 spot beam coverages are collected to form the service coverage 1 of the base station 100.

As such, a method that uses 57 spot beams for the service coverage 1 of the base station 100 may secure a similar capacity per area as compared with a method that deploys a plurality of small cells in the related art and reduce construction and maintenance cost.

One spot beam uses an ultra wideband. The ultra wideband may mean a frequency band based on a millimeter wave. As such, the base station 100 operates the ultra wideband as a radio resource to provide a large-capacity service, and a terminal that accesses the base station 100 may also request the large-capacity service. The ultra wideband may represent, for example, a super high frequency (SHF) band or an extremely high frequency (EHF) band.

The base station 100 divides the ultra wideband into a plurality of unit-bands (UBs) to operate the ultra wideband.

Figure 3:
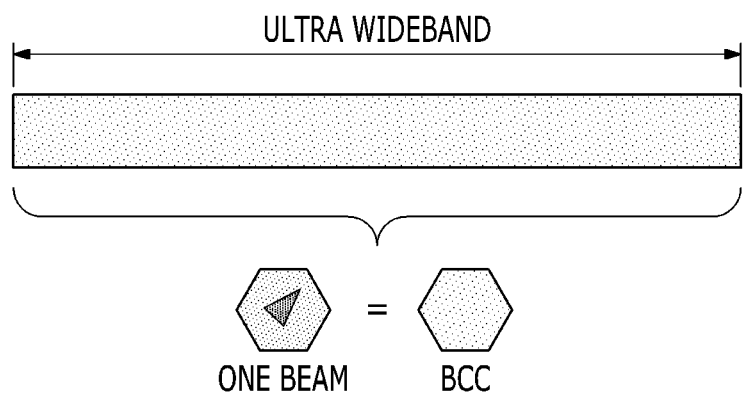
FIGS. 3 and 4 are diagrams illustrating one example of a method for operating a wideband frequency band of one spot beam according to the exemplary embodiment of the present invention, respectively.
Figure 4:
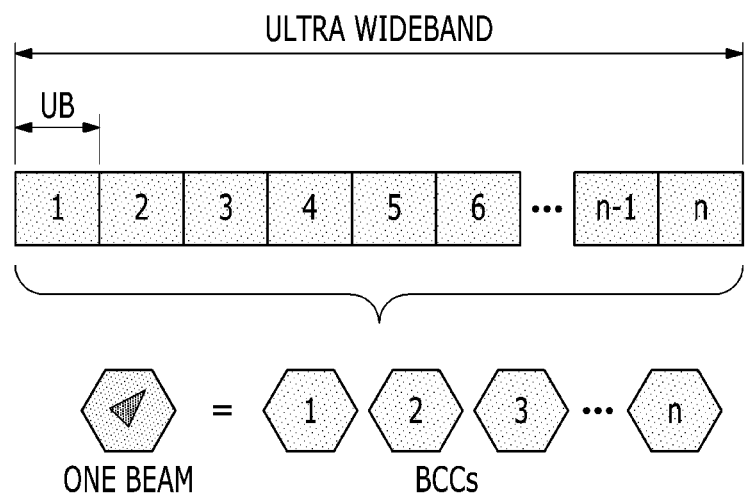

FIGS. 3 and 4 are diagrams illustrating one example of a method for operating a wideband frequency band of one spot beam according to an exemplary embodiment of the present invention, respectively.

Referring to FIG. 3, one spot beam may use the entire ultra wideband as one beam component carrier (BCC).

Referring to FIG. 4, one spot beam divides the entire ultra wideband into the plurality of UBs to operate the ultra wideband, and one spot beam may be used as the plurality of BCCs distinguished by the plurality of UBs.

Figure 5:
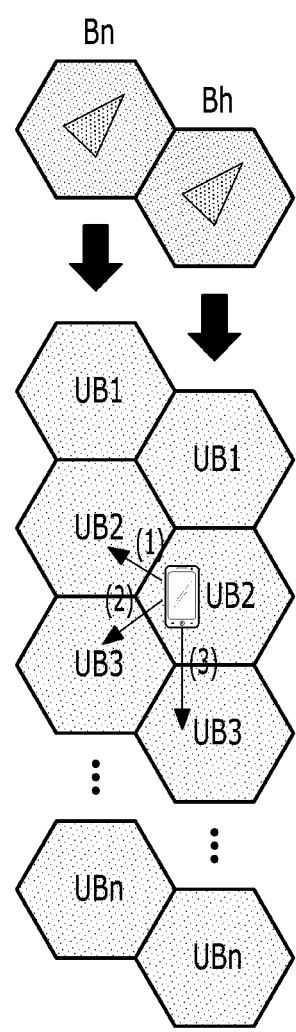
FIGS. 5 to 7 are diagrams illustrating movement of a terminal in the spot beam and UB component carriers according to the exemplary embodiment of the present invention.
Figure 6:
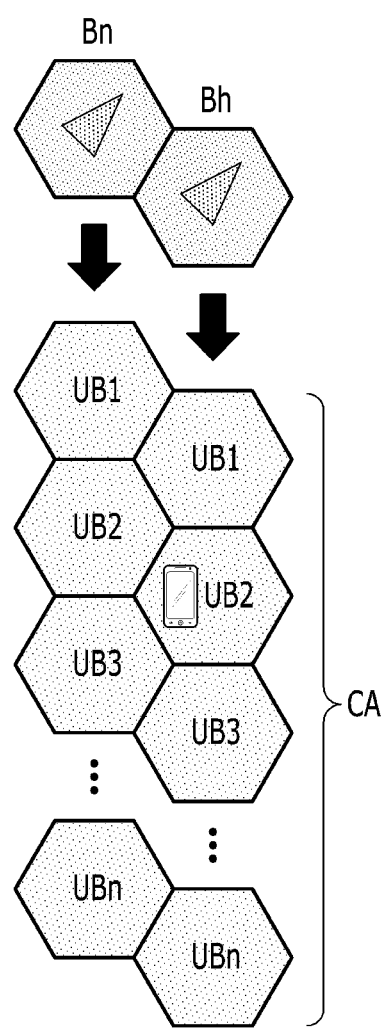
Figure 7:
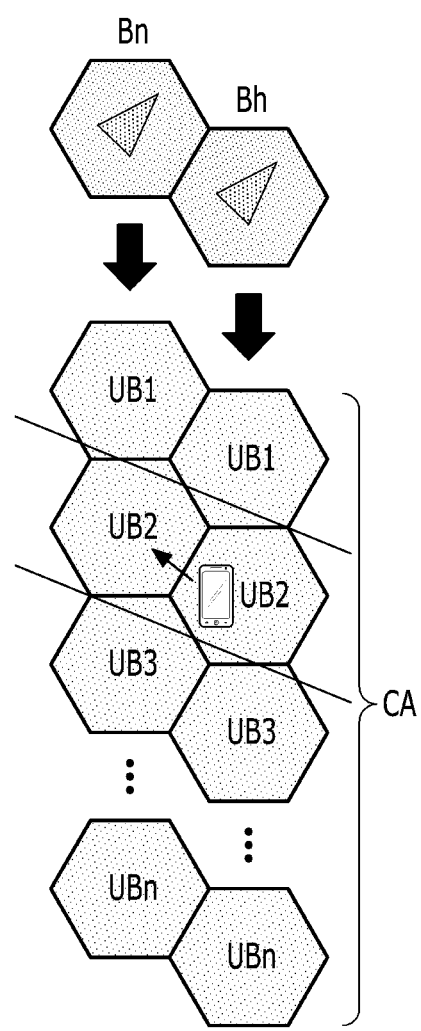

FIGS. 5 to 7 are diagrams illustrating movement of a terminal in the spot beam and UB component carriers according to the exemplary embodiment of the present invention.

Referring to FIG. 5, three movements of a terminal 200 may be performed while the terminal resides in a UB2 BCC of a current beam Bh.

The terminal 200 may move to the UB2 BCC of a beam Bn (1), move to a UB3 BCC which is a different frequency band from that of the UB2 BCC of the beam Bn (2), and move to the UB3 BCC which is a different frequency band from that of the UB2 BCC of the current beam Bh which is the same beam as the current Bh (3).

Movement of the terminal 200 to the UB2 BCC of another beam Bn is referred to as intra-frequency beam switching, movement of the terminal 200 to the beam Bn different from the current beam Bh is referred to as inter-frequency beam switching, and movement of the terminal 200 to the UB3 BCC of the same beam Bh as the current beam Bh is referred to as inter-frequency switching.

Referring to FIG. 6, when the terminal 200 that receives a service in the UB2 BCC of the beam Bh has a carrier aggregation (CA) capability, the UB2 BCC of the beam Bh in which the terminal 200 currently resides may be a primary BCC, and residual BCCs other than the UB2 BCC of the beam Bh may be a target of CA.

Further, referring to FIG. 7, when a frequency band in which the terminal 200 may move is limited to only the UB2 BCC in all beams, the terminal 200 may perform beam switching to only the UB2 BCC, and residual UB BCCs other than the UB2 BCC of the corresponding beam in which the terminal 200 resides may become the target of the CA.

Meanwhile, in FIGS. 5 and 7, the base stations that operate the beam Bh and the beam Bn may be the same base station or different base stations.

For example, in FIG. 5, when the base station that operates the beam Bh and the base station that operates the beam Bn are different from each other, the terminal 200 may move to the UB2 BCC of the beam Bn. In this case, since the UB2 BCC of the beam Bh and the UB2 BCC of the beam Bn should be defined as different cells, the movement is intra-frequency inter-BS handover, and simultaneously, the movement may be referred to as intra-frequency inter-BS inter-beam switching. Further, the movement of the terminal 200 to the UB3 BCC of the beam Bn may be referred to as inter-frequency inter-BS handover, and simultaneously, may be referred to as inter-frequency inter-BS beam switching.

In addition, in (1), (2), and (3) of FIG. 5, the movement of the terminal may be defined as both beam switching and handover. In this case, (1) may be defined as intra-frequency intra-BS handover, (2) may be defined as inter-frequency intra-BS handover, and (3) may be defined as inter-frequency intra-BS intra-beam handover.

Figure 8:
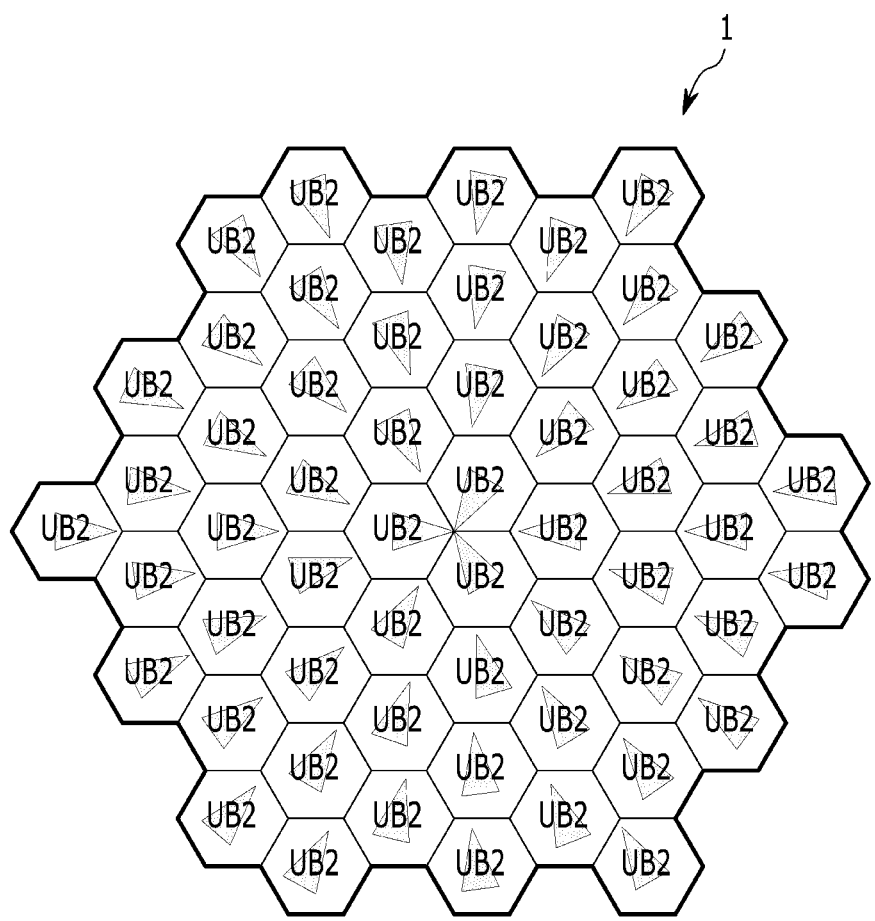
FIG. 8 is a diagram illustrating one example of service coverage of the base station constituted by multiple spot beams formed by array antenna assemblies of the base station illustrated in FIG. 1.

FIG. 8 is a diagram illustrating one example of service coverage of the base station constituted by multiple spot beams formed by array antenna assemblies of the base station illustrated in FIG. 1.

Referring to FIG. 8, in the service coverage 1 of the base station 100 constituted by the multiple spot beam coverage, the base station 100 may operate all BCCs (57 BCCs in FIG. 8) corresponding to a specific UB, for example, the UB2 as one cell. Operating all BCCs as one cell means operating all BCCs not like 57 BCC resources having a cell reference signal (CRS) and corresponding to individual UB2, but like one BCC resource.

When UB2 BCCs in a predetermined specific frequency band are grouped and the band covers the service coverage 1 of the base station 100 or the existing sector cell corresponds to the coverage as illustrated in FIG. 8, grouped cells of the same UB are regarded as cells that belong to a coverage layer to use the cells as cells for mobility (that is, cell selection and reselection or idle handover) in an idle state of the terminal 200 and mobility (that is, handover) in a connection state of the terminal 200.

Respective UB BCCs that belong to a specific UB of a plurality of spot beams are operated as one cell to be used as a capacity layer for data offloading of the terminal 200.

One cell generated by grouping the BCCs that belong to the specific UB of the plurality of spot beams may be used as a coverage layer for movement (cell (re)selection and handover) of the terminal 200 when the coverage of the cell is large and used as the capacity layer when the coverage of the cell is relatively small.

Figure 9A:
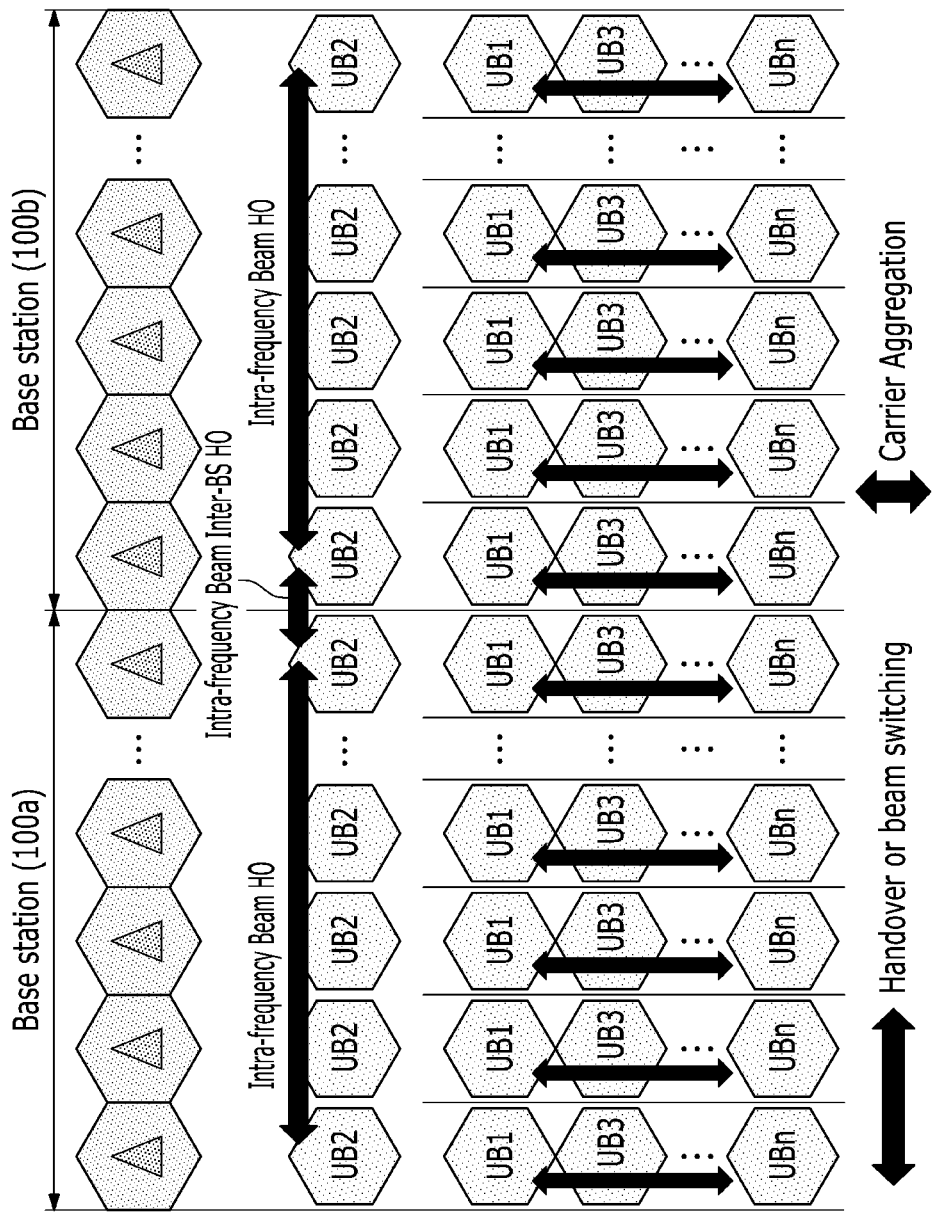
FIGS. 9A and 9B are diagrams illustrating one example of a method for operating a system according to another exemplary embodiment of the present invention.
Figure 9B:
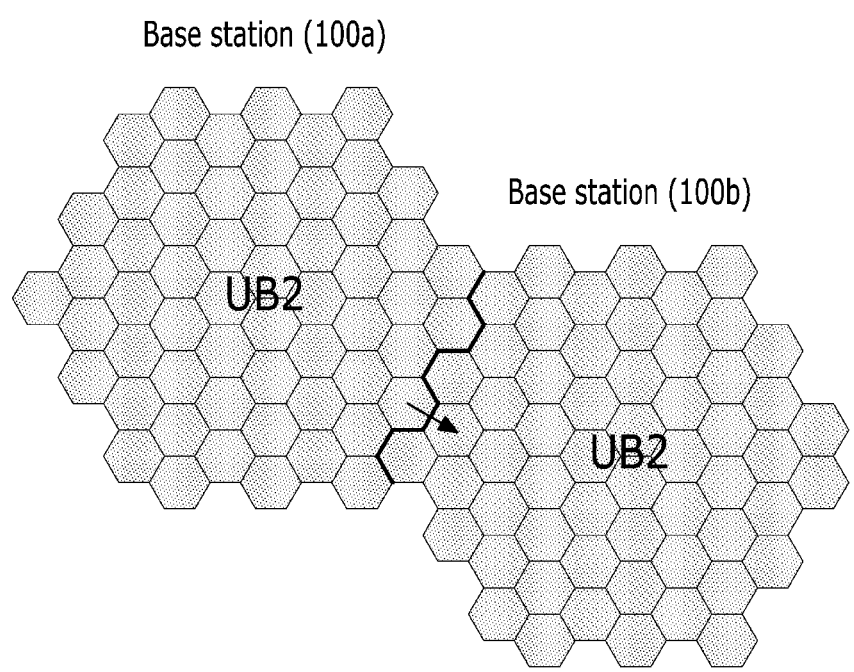

FIGS. 9A and 9B are diagrams illustrating one example of a method for operating a system according to another exemplary embodiment of the present invention.

Referring to FIGS. 9A and 9B, base stations 100a and 100b generate one cell as illustrated in FIG. 8 by grouping BCCs corresponding to the specific UB (e.g., UB2), respectively to use one cell as the coverage layer for the movement of the terminal 200, as illustrated in FIG. 9B.

The terminal may switch another beam in the same base station 100a or 100b to the UB2 BCC, and the intra-frequency inter-base station handover (alternatively, cell (re)selection) of the terminal 200 may be performed between a UB2 BCC grouping cell of the base station 100a and a UB2 BCC grouping cell of the base station 100b.

When the terminal resides in the UB2 BCC grouping cell in one beam, the base stations 100a and 100b may use BCC grouping cells of other UBs in the corresponding beam for the CA. As described above, a cell to which the UB2 BCC belongs may mean a cell generated by grouping one or more UB2 BCCs or a cell constituted by one UB2 BCC.

Figure 10A:
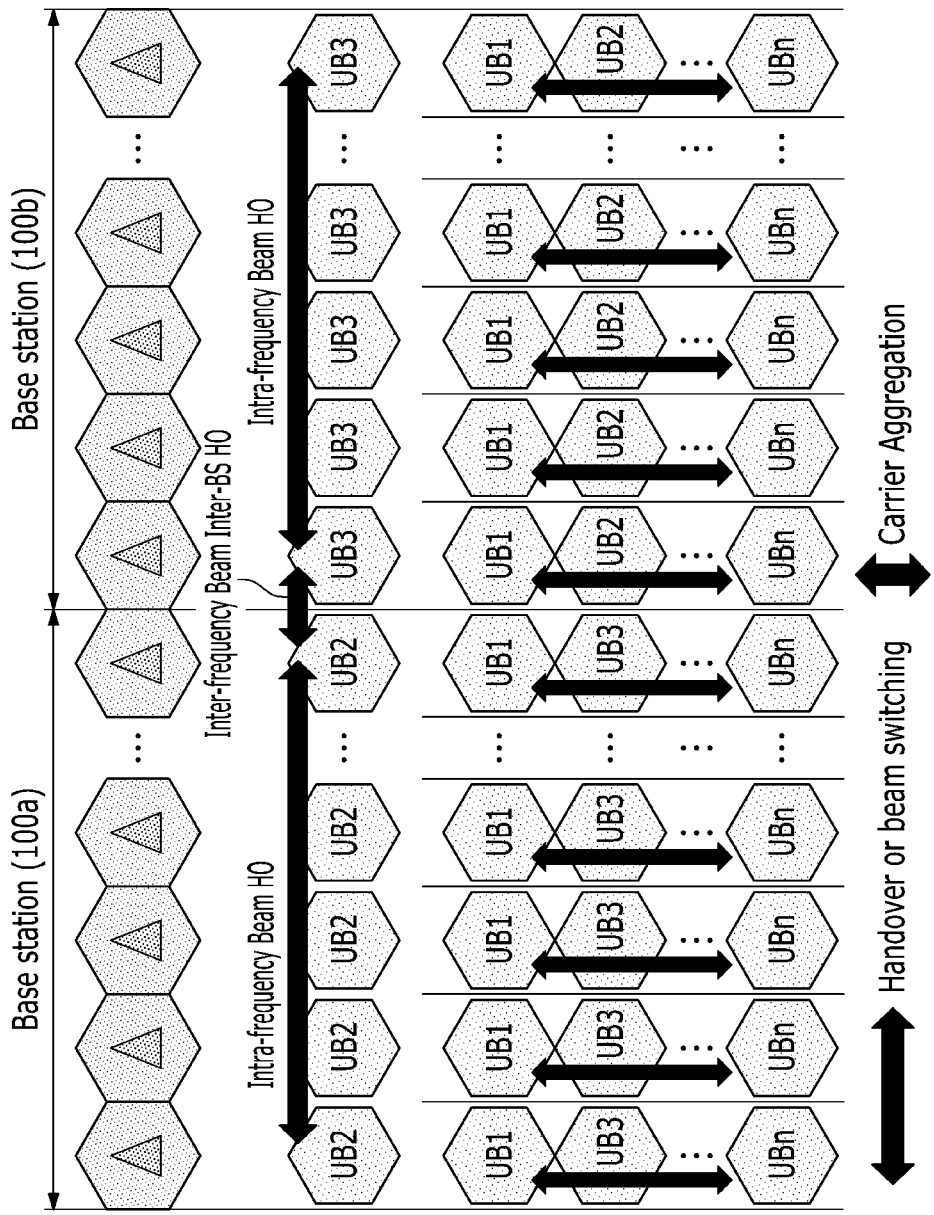
FIGS. 10A and 10B are diagrams illustrating another example of the method for operating a system according to the exemplary embodiment of the present invention.
Figure 10B:
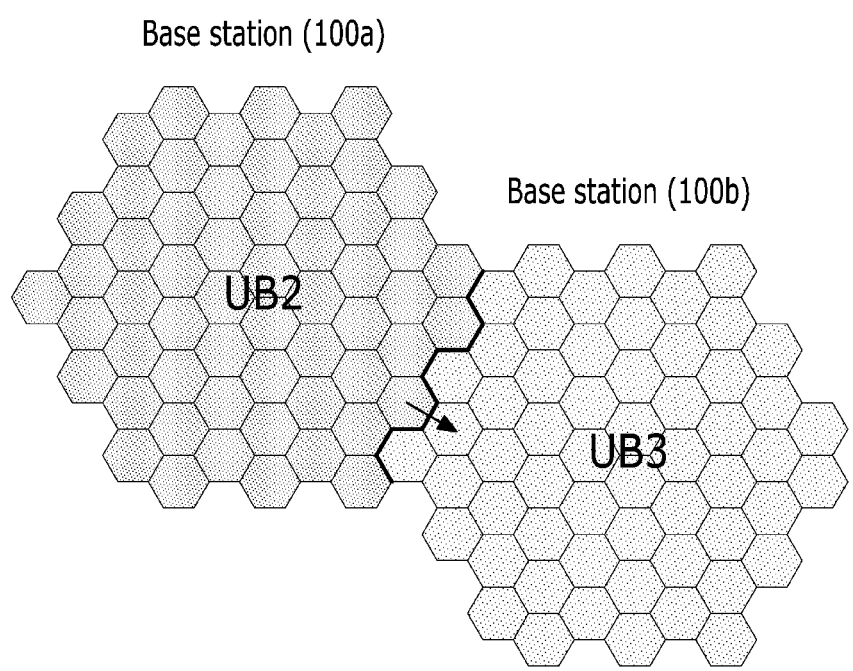

FIGS. 10A and 10B are diagrams illustrating another example of the method for operating a system according to the exemplary embodiment of the present invention.

Referring to FIGS. 10A and 10B, the base stations 100a and 100b may configure respective different specific UBs (e.g., UB2 or UB3) as the coverage layer for the movement of the terminal 200. For example, as illustrated in FIG. 10B, the base station 100a groups the BCCs that belong to the UB2 to operate the grouped BCCs as one cell and configures the UB2 BCC grouping cell as the coverage layer. In addition, the base station 100b groups BCCs that belong to the UB3 to operate the grouped BCCs as one cell and configures the UB3 BCC grouping cell as the coverage layer. As such, when the base stations 100a and 100b operate BCC grouping cells in different bands as the coverage layer, interference between the base stations 100a and 100b may be avoided.

The terminal may switch to the UB2 BCC of another beam in the same base station 100a or 100b and perform inter-frequency inter-base station handover (alternatively, cell (re)selection of the terminal 200 between the B2 BCC grouping cell of the base station 100a and the UB3 BCC grouping cell of the base station 100b).

When the terminal resides in the UB2 BCC grouping cell in one beam of the base station 100a, the base station 100a may use BCC grouping cells of other UBs in the corresponding beam for the CA. Similarly, when the terminal resides in the UB3 BCC grouping cell in one beam of the base station 100b, the base station 100b may use BCC grouping cells of other UBs in the corresponding beam for the CA.

Figure 10C:
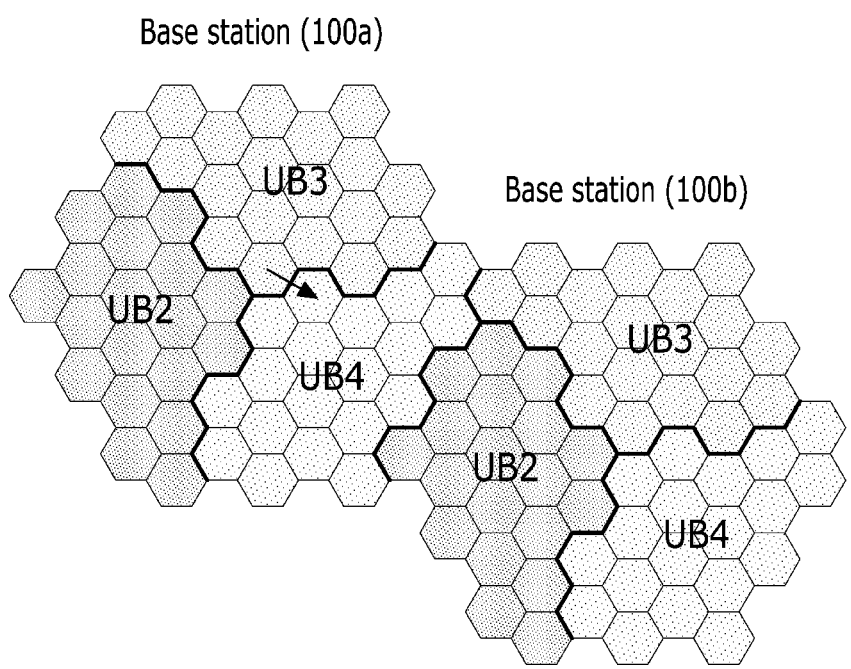
FIGS. 10C and 10D are diagrams illustrating yet another example of the method for operating a system according to the exemplary embodiment of the present invention, respectively.
Figure 10D:
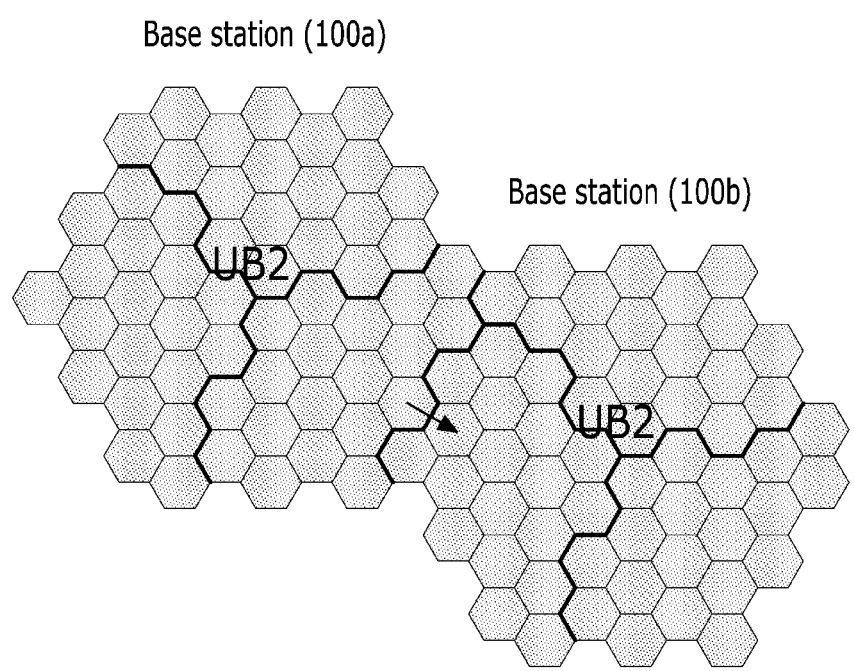

FIGS. 10C and 10D are diagrams illustrating yet another example of the method for operating a system according to the exemplary embodiment of the present invention, respectively.

As illustrated in FIG. 10C, the base stations 100a and 100b locally group and operate BCCs corresponding to different UBs (e.g., UB2, UB3, and UB4), respectively. When the base stations 100a and 100b operate the BCCs, the terminal may perform beam switching to different UB BCCs of the same beam in the same base station 100a or 100b.

Such an operating method may avoid inter-base station and inter-UB BCC grouping cell interference.

Further, as illustrated in FIG. 10D, all BCCs corresponding to the specific UB (e.g., UB2) are not operated as one cell but may be locally grouped and operated as three cells in one base station 100a or 100b.

Figure 11B:
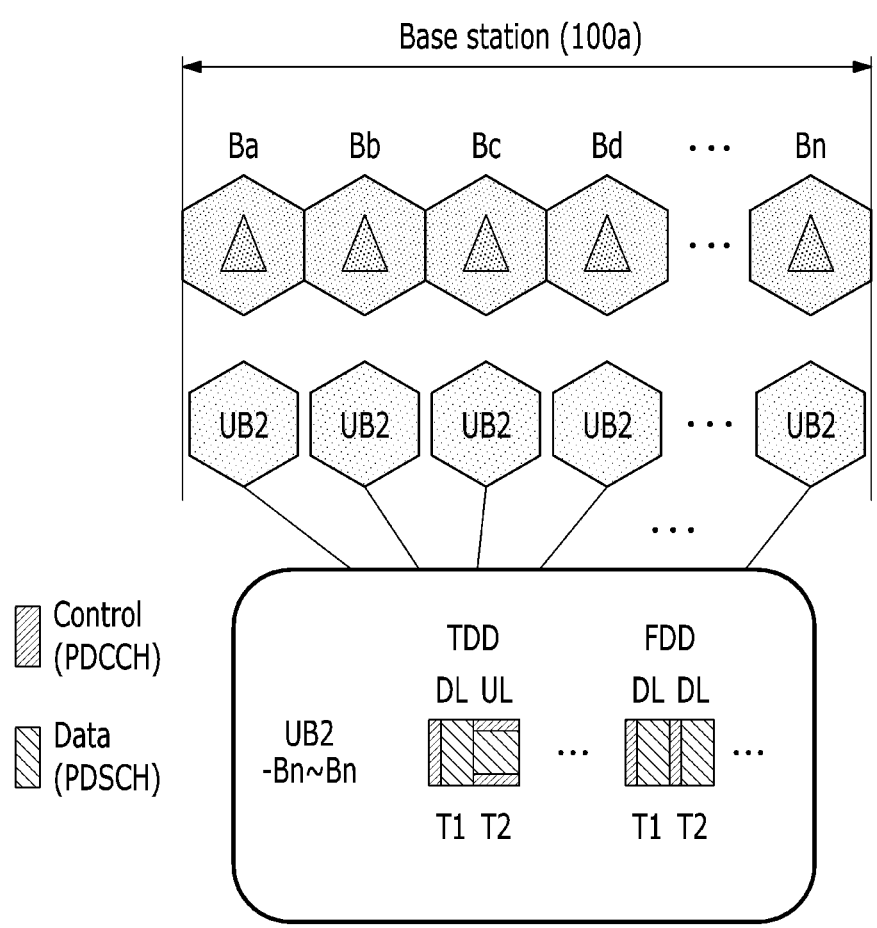

FIGS. 11A and 11B are diagrams illustrating one example of a method for operating a system in terms of resource management for BCCs corresponding to a specific UB according to the exemplary embodiment of the present invention, respectively.

Referring to FIG. 11A, when the base station 100a operates all BCCs corresponding to the UB2 for different beams Ba to Bn as individual cells, the base station 100a may operate the system so as to individually schedule the UB2 BCC cells of the respective spot beams Ba to Bn.

The base station 100a may operate the system in a frequency division duplex (FDD) mode and a time division duplex (TDD) mode for resource allocation for traffic and control in the UB2 BCC cell of each spot beam.

The base station 100a may allocate a resource for the UB2 to a DL resource and a UL resource in a time domain in the case of the TDD. For example, the base station 100a may allocate the resource for the UB2 to the DL resource at a time T1 and allocate the resource for the UB2 to the UL resource at a time T2.

The base station 100a may allocate the resource for the UB2 to a DL or UL dedicated resource in the case of the FDD. For example, the base station 100a may allocate the resource for the UB2 to the DL resource at the time T1 and T2. In FIG. 11A, it is illustrated that the UB2 is allocated to the DL dedicated resource. In this case, UBs other than the UB2 may be allocated for a UL purpose.

In such a system operating method, since one BCC becomes the cell, a base station capacity increases, but frequent handover occur, and as a result, movement performance of the terminal may not be guaranteed.

Referring to FIG. 11B, when the base station 100a groups all BCCs corresponding to the UB2 for different beams Ba to Bn to operate the grouped BCCs as one cell, the base station 100a may operate the system so as to integrally schedule the UB2 BCC cells of the grouped spot beams Ba to Bn.

Unlike FIG. 11A, since all BCCs that belong to the UB2 of each beam are not operated as individual cell resources but operated as one cell resource, there is no inter-beam interference and a macro cell effect similar to an effect in the existing actual cellular system may be provided.

The base station 100a may be operated in the FDD mode and the TDD mode for the resource allocation for the traffic and the control in the UB2 BCC grouping cell in which all BCCs that belong to the UB2 of each beam are grouped. The resource for the UB2 may be allocated to the downlink (DL) resource and the uplink (UL) resource in the time domain in the case of the TDD. For example, the base station 100a may allocate the resource for the UB2 to the DL resource at the time T1 and allocate the resource for the UB2 to the UL resource at the time T2.

Further, the resource for the UB2 may be allocated to the DL or UL dedicated resource in the case of the FDD. In FIG. 11B, it is illustrated that the UB2 is allocated to the DL dedicated resource. In this case, UBs other than the UB2 may be allocated for the UL purpose.

As illustrated in FIG. 11A, when individual resources for the respective BCCs for the specific UB of the individual beams are operated as the integrated resource as illustrated in FIG. 11B, the base station capacity may decrease, but the inter-beam interference decreases and the handover is not relatively frequent, and as a result, the movement performance of the terminal is improved. In particular, the same software joint as joint transmission (JT) in the DL and joint reception (JR) in the UL is performed to improve reception sensitivity of a signal and data.

Figure 12:
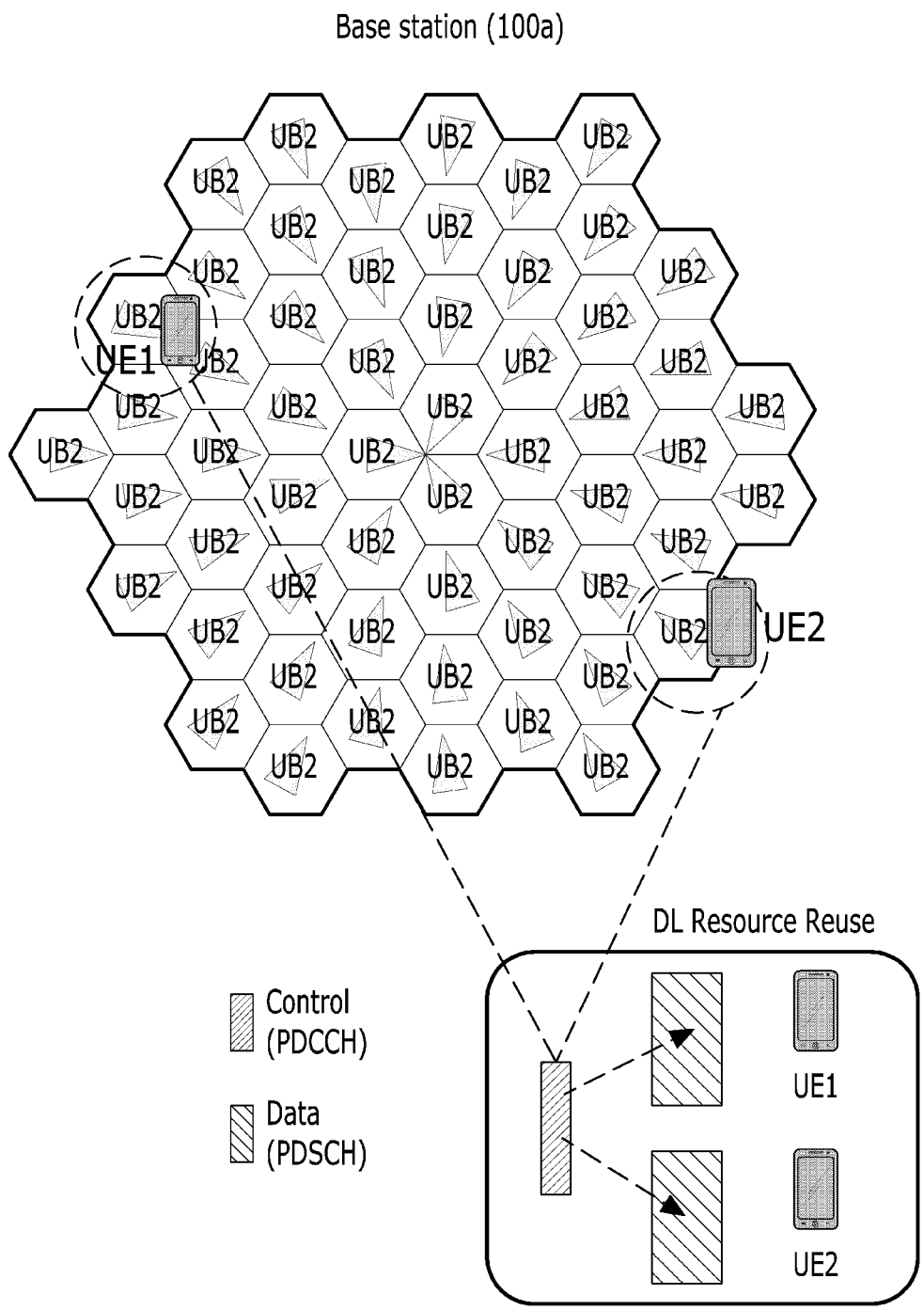
FIG. 12 is a diagram illustrating another example of the method for operating a system in terms of resource management for BCCs corresponding to a specific UB according to the exemplary embodiment of the present invention.

Meanwhile, a method of FIG. 12 may be used in order to solve a disadvantage of capacity reduction at the time of operating the system as illustrated in FIG. 11B.

FIG. 12 is a diagram illustrating another example of the method for operating a system in terms of resource management for BCCs corresponding to a specific UB according to the exemplary embodiment of the present invention.

Referring to FIG. 12, the base station 100a primarily operates the system as illustrated in FIG. 11B. In this case, it is assumed that terminals UE1 and UE2 sense a reference signal (RS) of each beam and feed back the information to the base station 100a in the DL.

The base station 100a may estimate that there is no interference between the UB2 BCC in which the terminal UE1 resides and the UB2 BCC in which the terminal UE2 resides when a beam RS for the UB2 BCC in which the terminal UE2 resides is not detected from feedback information of the terminal UE1 or when the beam RS for the UB2 BCC in which the terminal UE1 resides is not additionally detected from feedback information of the terminal UE2. Accordingly, the base station 100a may allocate a resource of a data domain for the same UB2 at the same time for the terminals UE1 and UE2. That is, the base station 100a pairs BCCs which do not interfere with each other and allocates the same resource to the paired BCCs to transmit different information to the data domain among the paired BCCs.

Figure 13:
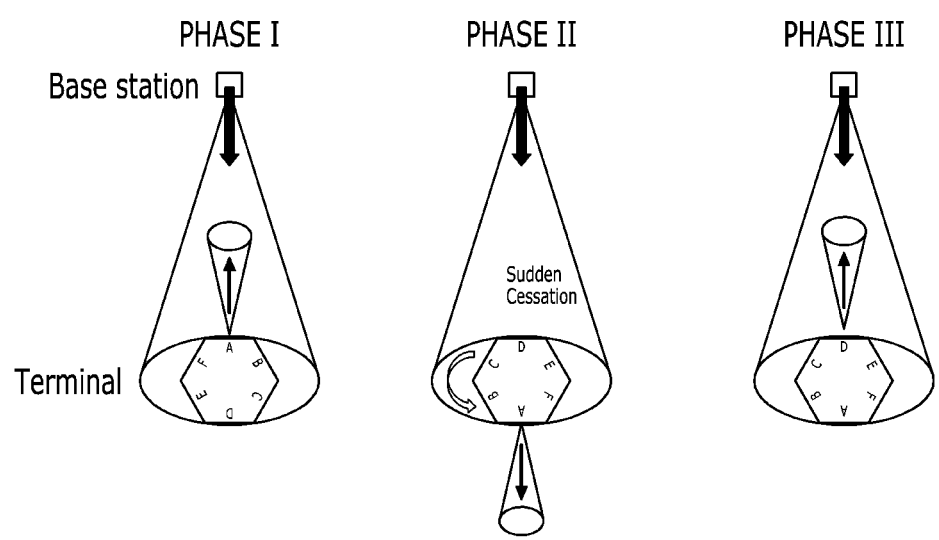
FIG. 13 is a diagram for describing a beam tracking concept in a terminal according to the exemplary embodiment of the present invention.

FIG. 13 is a diagram for describing a beam tracking concept in a terminal according to the exemplary embodiment of the present invention.

Referring to FIG. 13, a signal and data for the terminal are transmitted through a downlink beam and the signal and data of the terminal are transmitted to the base station through an uplink beam of the terminal.

The terminal may include 6 array antenna ports A, B, C, D, E, and F, and the terminal may include a plurality of antennas.

The terminal performs beam tracking according to a measurement instruction of the base station. The measurement instruction may include measurement control information.

The terminal may perform signal strength measurement for each beam in a physical layer. The terminal receives a common reference signal (CRS) and the beam RS from all array antenna ports A, B, C, D, E, and F and obtains a measurement value for each array antenna port. A CRS measurement value for each port includes an average value and is used for cell (re)selection or handover. A beam RS measurement value for each port is used to find an optimal beam and select a UL port.

The respective BSSs of the UB BCC grouping cell transmit a common CRS and each BSS transmits a unique beam RS.

The terminal transmits the uplink beam in a direction in which the strength of the beam RS is input to be largest.

In phase I, the terminal may form the UL beam by using the A antenna port into which the signal strength of the downlink beam is input to be largest through the beam tracking.

In phase II, sudden cessation such as rotation of the terminal itself occurs, and as a result, the received strength of the beam RS may decrease. In this case, as shown in phase III, the terminal finds an antenna port having highest received strength of the beam RS for the corresponding beam while performing the beam tracking to camp on the corresponding beam or form the UL beam with the found antenna port again.

During a process in which the terminal changes the cell in the beam or the beam, when the terminal is in the idle state, the terminal finds an optimal cell and resides in the optimal cell by measuring a CRS and a beam RS corresponding to an inter-frequency and an intra-frequency for each antenna port, and periodically verifies an optimal beam and a port in which the beam is input. During such a process, the terminal performs a random access procedure with a port corresponding to the optimal cell and the optimal beam at the time of requesting access for a service.

On the contrary, the terminal transmits the optimal beam and the resulting optimal UL beam by measuring the beam RS that belongs to the corresponding cell while residing in the cell corresponding to the coverage layer which the terminal currently accesses in an accessed state in which the terminal receives the service.

Measurement control information associated with the beam tracking is determined by the base station, and the measurement control information may be transmitted through system information of the corresponding cell of the corresponding beam while the terminal is in the idle state and transmitted through an accessed dedicated channel while the terminal is in the accessed state.

Further, when a beam providing a better propagation characteristic than the currently accessed beam is searched while performing the beam tracking, the terminal may switch the beam to the searched beam. In this case, the beam to be switched may be a beam controlled by the same base station as the currently accessed beam or beams controlled by different base stations.

In the following description, a case in which one BCC is operated as one cell is assumed, but all contents to be described below may be extensively applied to a case in which the BCCs of the specific bands of each beam are grouped to be operated as one cell.

Figure 14:
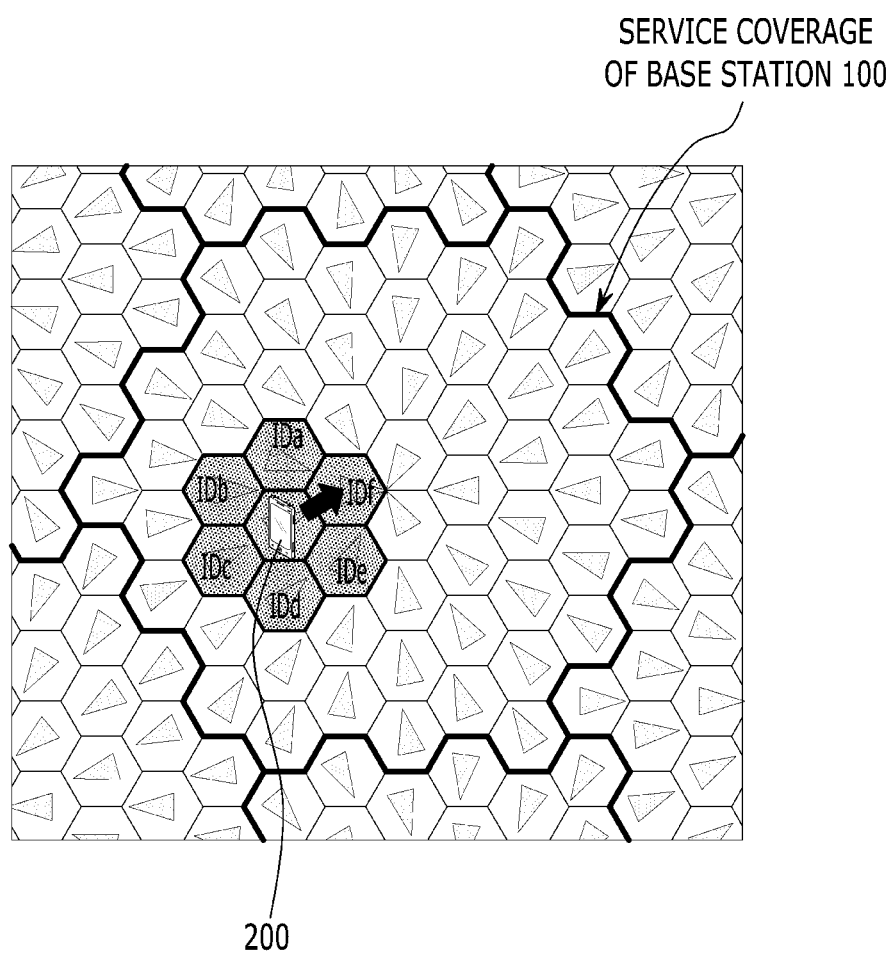
FIG. 14 is a diagram illustrating beam switching of the terminal in the same base station according to the exemplary embodiment of the present invention.

FIG. 14 is a diagram illustrating beam switching of the terminal in the same base station according to the exemplary embodiment of the present invention.

Referring to FIG. 14, the base station 100 operates a plurality of beams and allocates beam identifiers IDs and unique beam RSs to the plurality of beams, respectively.

The terminal 200 accesses a beam IDg among the plurality of beams.

The base station 100 executes advanced resource preparation for neighboring beams IDa, IDb, IDc, IDd, IDe, and IDf of the beam IDg accessed by the terminal 200.

The terminal 200 may move to the beam IDf providing a better propagation characteristic than the beam IDf while performing the beam tracking.

The terminal 200 releases an advancingly prepared resource with respect to the beams IDa, IDb, and IDc of which advance preparation is not required among beams which are advancingly prepared by switching the beam IDg in the same base station to the beam IDf, and executes advanced resource preparation with respect to the beams IDh, IDi, and IDj of which advance preparation is newly required.

Figure 15:
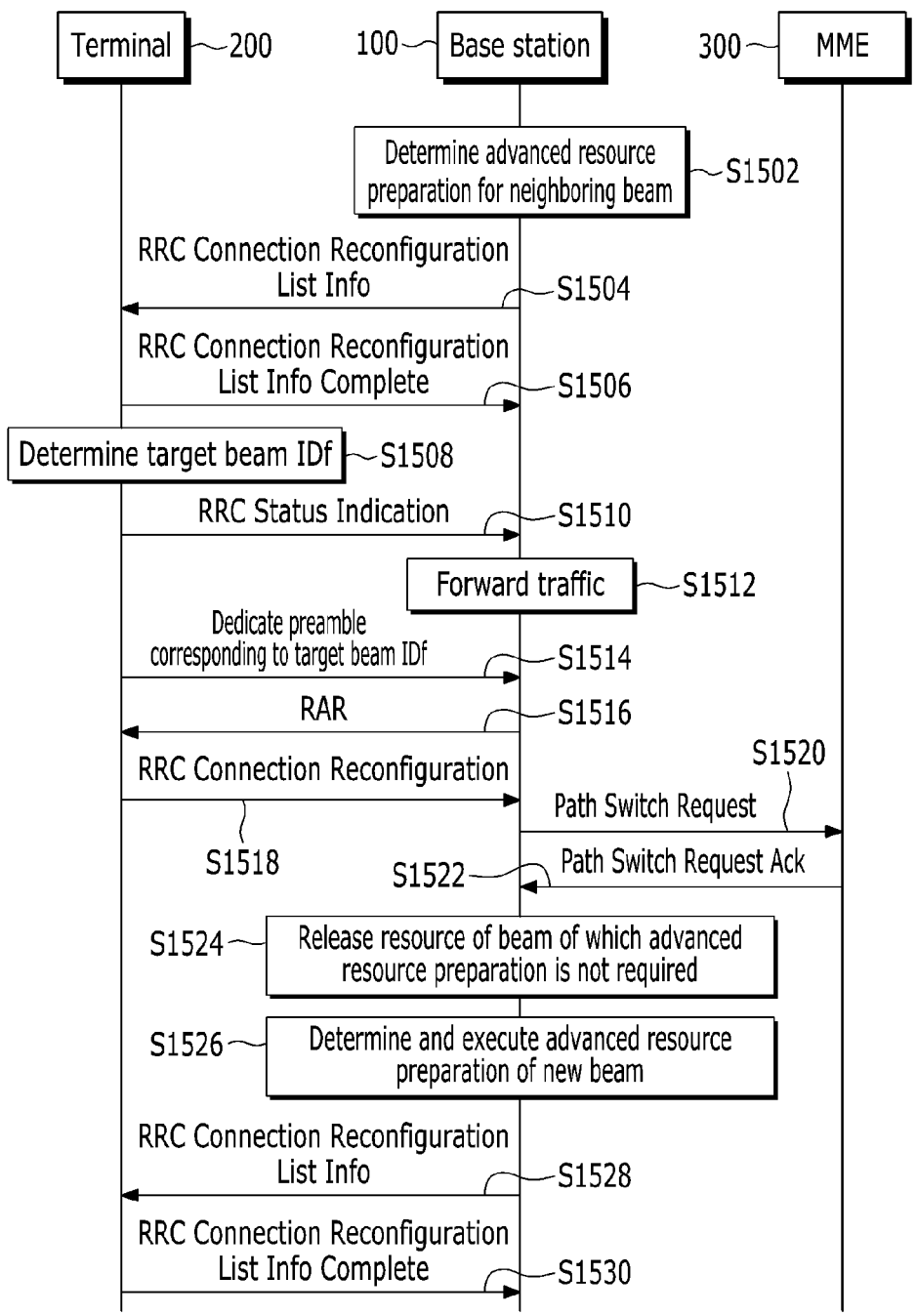
FIG. 15 is a diagram illustrating a beam switching procedure illustrated in FIG. 14 in detail.

FIG. 15 is a diagram illustrating, in detail, a beam switching procedure illustrated in FIG. 14.

Referring to FIG. 15, the base station 100 that controls the beam (hereinafter referred to a "serving beam") IDg which the terminal 200 currently accesses determines the advanced resource preparation for the neighboring beams IDa, IDb, IDc, IDd, IDe, and IDf of the serving beam IDg (S1502).

The base station 100 may determine advanced resource preparation of all neighboring beams corresponding to 1 tier around the serving beam IDg or determine selective advanced resource preparation for the neighboring beams by using information a configured first event or/and OAM/history/terminal velocity. For example, the first event may mean a case in which a neighboring cell signal strength is larger than a predetermined threshold. The OAM may mean information on cells around a current cell, and the history may include cell movement information of the terminal and a residence time of the corresponding cell.

Since the base station 100 controls all of the neighboring beams IDa, IDb, IDc, IDd, IDe, and IDf, the base station 100 executes the advanced resource preparation for the neighboring beams IDa, IDb, IDc, IDd, IDe, and IDf of which the advanced resource preparation is determined.

The base station 100 determines the advanced resource preparation for the neighboring beams IDa, IDb, IDc, IDd, IDe, and IDf of the serving beam IDg, and transmits an RRC message such as RRC connection reconfiguration list information including advanced resource preparation information of each beam to the terminal 200 through the serving beam IDg after executing the advanced resource preparation (S1504). The advanced resource preparation information of each beam may include dedicated preamble information for random access to each beam.

The terminal 200 transmits the RRC message such as RRC connection reconfiguration list info complete to the base station 100 through the serving beam IDg as a response to the RRC connection reconfiguration list information when receiving the advanced resource preparation information of each beam (S1506).

The terminal 200 having the advanced resource preparation information for the neighboring beams IDa, IDb, IDc, IDd, IDe, and IDf around the serving beam IDg continuously measures signal qualities for the serving beam IDg and the neighboring beams IDa, IDb, IDc, IDd, IDe, and IDf, and determines an optimal target beam while comparing signals qualities among the beams (S1508). It is assumed that the determined target beam is the beam IDf controlled by the base station 100.

The terminal 200 transmits the RRC message such as an RRC status indication to the base station 100 through the serving beam IDg to notify that the terminal 200 moves to the target beam IDf to the base station 100 (S1510). Transmission of the RRC status indication may be omitted.

The base station 100 that receives the RRC status indication recognizes that the terminal 200 moves from the serving beam IDg to the target beam IDf and processes forwarding downlink traffic or/and received uplink traffic to the serving beam IDg from the serving beam IDg to the target beam IDf (S1512).

When the terminal 200 determines movement of a radio access link from the serving beam IDg to the target beam IDf, the terminal 200 transmits a dedicated preamble corresponding to the target beam IDf from the advanced resource preparation information to the base station 100 through the target beam IDf (S1514).

The base station 100 that receives the dedicated preamble corresponding to the target beam IDf verifies whether the dedicated preamble corresponding to the target beam IDf is an advancingly reserved preamble, and when the corresponding dedicate preamble is the advancingly reserved preamble, the base station 100 transmits a random access response (PAR) to the terminal 200 through the target beam IDf (S1516).

The terminal 200 that receives the random access response (PAR) transmits the RRC message such as the RRC connection reconfiguration complete to the base station 100 (S1518) to complete a new radio access configuration in the target beam IDf. The RRC connection reconfiguration complete may include information that the terminal 200 moves from the serving beam IDf to the target beam IDf.

The RRC connection reconfiguration complete may include information that the terminal 200 moves from the serving beam IDf to the target beam IDf. The base station 100 may perform traffic forwarding from the serving beam IDg to the target beam IDf, and in this case, when the traffic forwarding from the serving beam IDg to the target beam IDf is already performed in step S1512, the traffic forwarding may be omitted.

Although the terminal 200 moves from the beam IDg controlled by the base station 100 to the beam IDf, traffic path information may be changed, and when downlink traffic path information is changed by beam movement, the base station 100 may transmit the path switch information to an MME 300 through an S1 application protocol (S1AP) message such as a path switch request (S1520).

The MME 300 that receives the path switch request message updates the changed downlink traffic path information and transmits the S1AP message such as path switch request Ack to the base station 100 as a response to the path switch request (S1522). In this case, when even the MME 300 intends to change uplink traffic path information, the changed uplink traffic path information may be included in the path switch request Ack.

When the movement of the terminal 200 from the serving beam IDg to the target beam IDf is completed, it is reviewed whether the advanced resource preparation is not required with respect to beams of which advanced resource preparation is made based on the previously accessed beam IDg, and resource release for the beams of which the advanced resource preparation is not required is performed (S1524). A method based on measurement such as a configured second event may be used for reviewing whether the resource of the beam of which advanced resource preparation is made. Contrary to the first event, the second event may mean a case in which a signal strength of a neighboring cell is equal to or less than a set threshold. Similarly to the advanced resource preparation, the resource release may also be determined through integral determination using the first event and the information such as the OAM/history/terminal velocity.

In addition, the base station 100 may review beams of which advanced resource preparation is newly required among neighboring beams of the newly accessed beam IDf, and determine and execute the advanced resource preparation for the new beams of which advanced resource preparation is required (S1526).

For example, neighboring beams of the beam IDf to which the terminal 200 moves include the beams IDa, IDg, IDe, IDh, IDi, and IDj. Accordingly, the beams IDb, IDc, and IDd among the beams IDa, IDb, IDc, IDd, IDe, and IDf of which advanced resource preparation is made based on the previous beam IDf correspond to the beams of which advanced resource preparation is not required. Therefore, the base station 100 may determine the resource release with respect to the beams IDb, IDc, and IDd and perform the resource release.

In addition, since the beams IDh, IDi, and IDj are not the IDa, IDg, IDe, IDh, IDi, and IDj of which advanced resource preparation is made based on the previous beam IDg, the beams IDh, IDi, and IDj correspond to the beams of which advanced resource preparation is newly required. Accordingly, the base station 100 may determine the advanced resource preparation with respect to the beams IDh, IDi, and IDj of the base station 100 and execute the advanced resource preparation.

The base station 100 processes advanced resource preparation information of the beams of which resource release is required and a new beam in the advanced resource preparation information of each beam to add information on the beams of which source release is required to a release list, and add the advanced resource preparation information of the new beam to an addition modification list.

The base station 100 transmits the RRC connection reconfiguration info list including the release list and the addition modification list to the terminal 200 through the serving beam IDf (S1528).

The terminal 200 that receives the RRC connection reconfiguration info list updates the advanced resource preparation information of each beam by using information of the release list and the addition modification list. The terminal 200 deletes information on the beams included in the release list from an advanced resource preparation information entry of each beam and adds or modifies the advanced resource preparation information of the beams included in the addition modification list.

The terminal 200 transmits an RRC connection reconfiguration information list complete message to the base station 100 through the serving beam IDf as a response to the RRC connection reconfiguration info list message (S1530).

Figure 16:
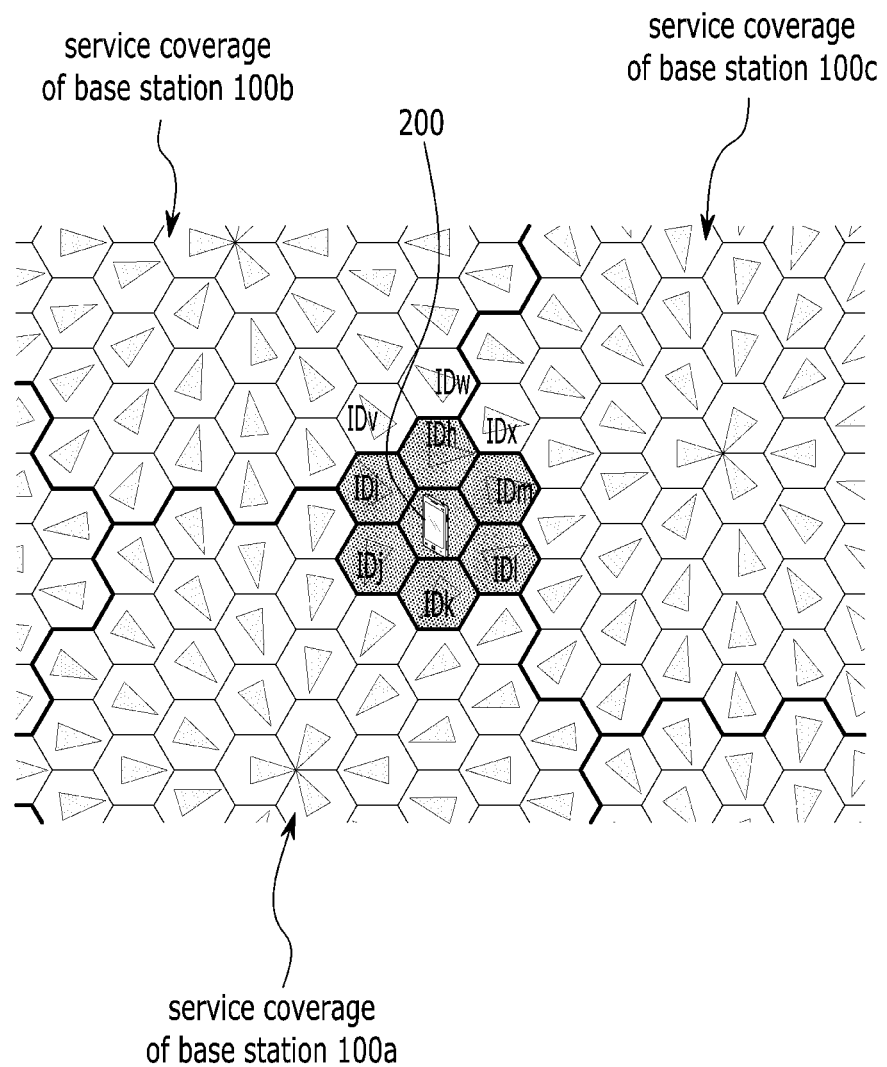
FIG. 16 is a diagram illustrating beam switching of the terminal between different base stations according to the exemplary embodiment of the present invention.

FIG. 16 is a diagram illustrating beam switching of the terminal between different base stations according to the exemplary embodiment of the present invention.

Referring to FIG. 16, the terminal may move between beams that belong to different base stations.

The base stations 100*a*, 100*b*, and 100*c* are identified by base station identifiers, and the beams are identified by beam identifiers IDi, IDj, IDk, IDl, IDm, IDn, IDh, IDv, IDw, and IDx.

The base station 100*a* that controls the beam IDn accessed by the terminal 200 becomes a serving base station 100*a*. The terminal 200 accesses the serving beam IDn of the serving base station 100*a* to transmit and receive data.

The base station 100*a* executes advanced resource preparation for neighboring beams IDj, IDk, IDi, IDh, IDm, and IDl of the serving beam IDn.

The terminal 200 may determine the optimal target beam by continuously measuring the signal qualities of the serving beam IDn and the neighboring beams while performing the beam tracking. In this case, the target beam may be the beam IDh controlled by the base station 100*c* other than the serving base station 100*a*.

The terminal 200 may move to the target beam IDh of the base station 100*c* having a higher signal quality than the serving beam IDn of the serving base station 100*a*. Alternatively, the terminal 200 may move to the optimal target beam when a failure occurs in the radio access link of the serving beam IDn of the serving base station 100*a*.

The base station 100*c* releases an advancingly prepared resource with respect to the beams IDj, IDk, and IDl of which advance preparation is not required among beams which are advancingly prepared as the terminal 200 moves to the target beam IDh of another base station 100*c* and executes advanced resource preparation with respect to the beams IDv, IDw, and IDx of which advance preparation is newly required.

Figure 17:
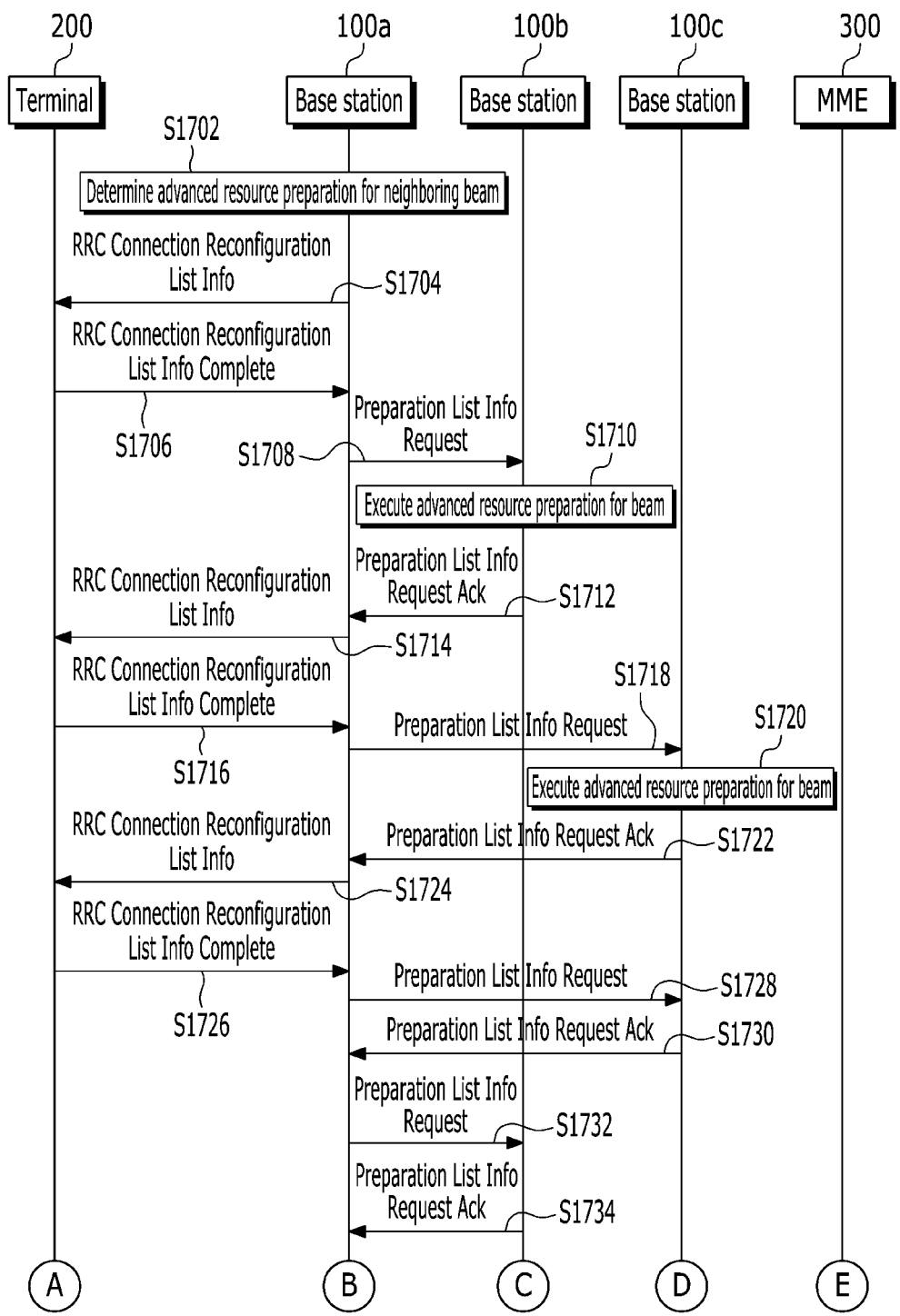
FIGS. 17 to 19 are diagrams illustrating the beam switching procedure illustrated in FIG. 16 in detail.
Figure 18:
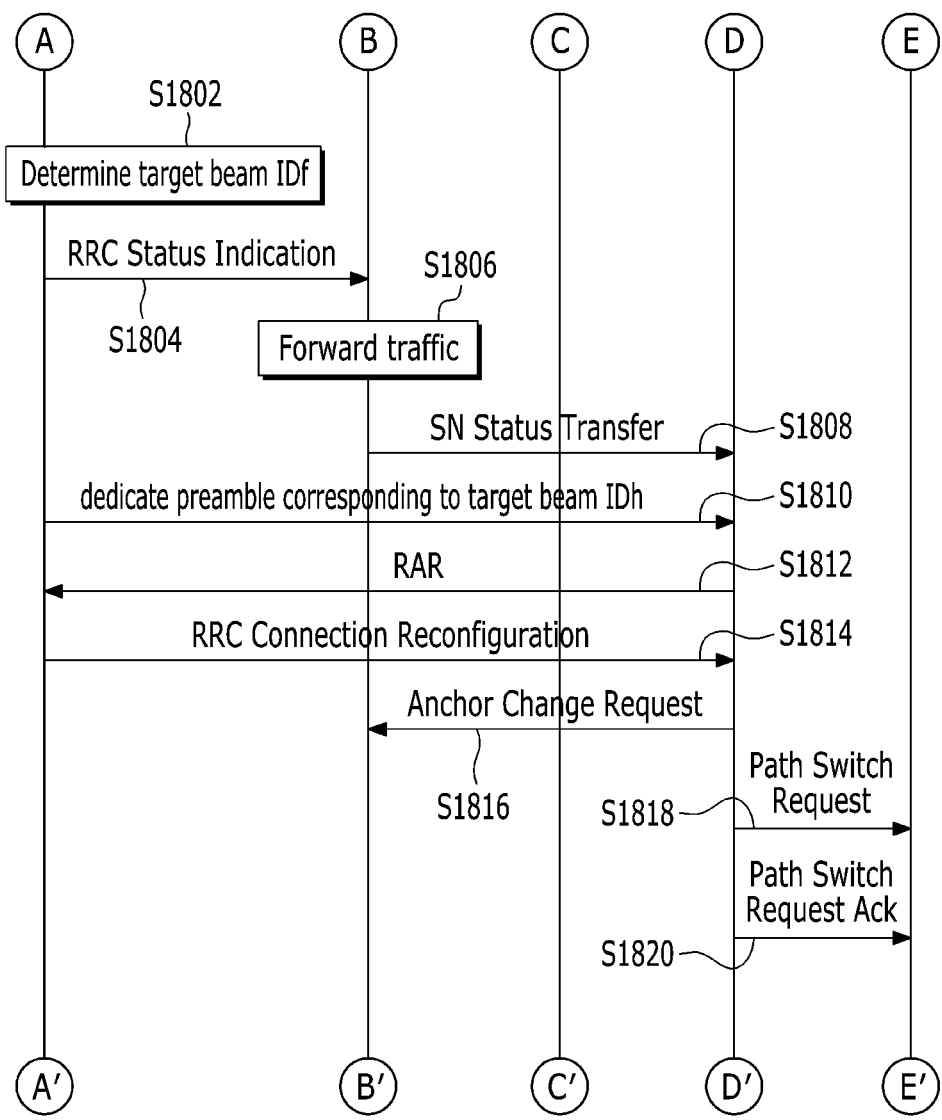
Figure 19:
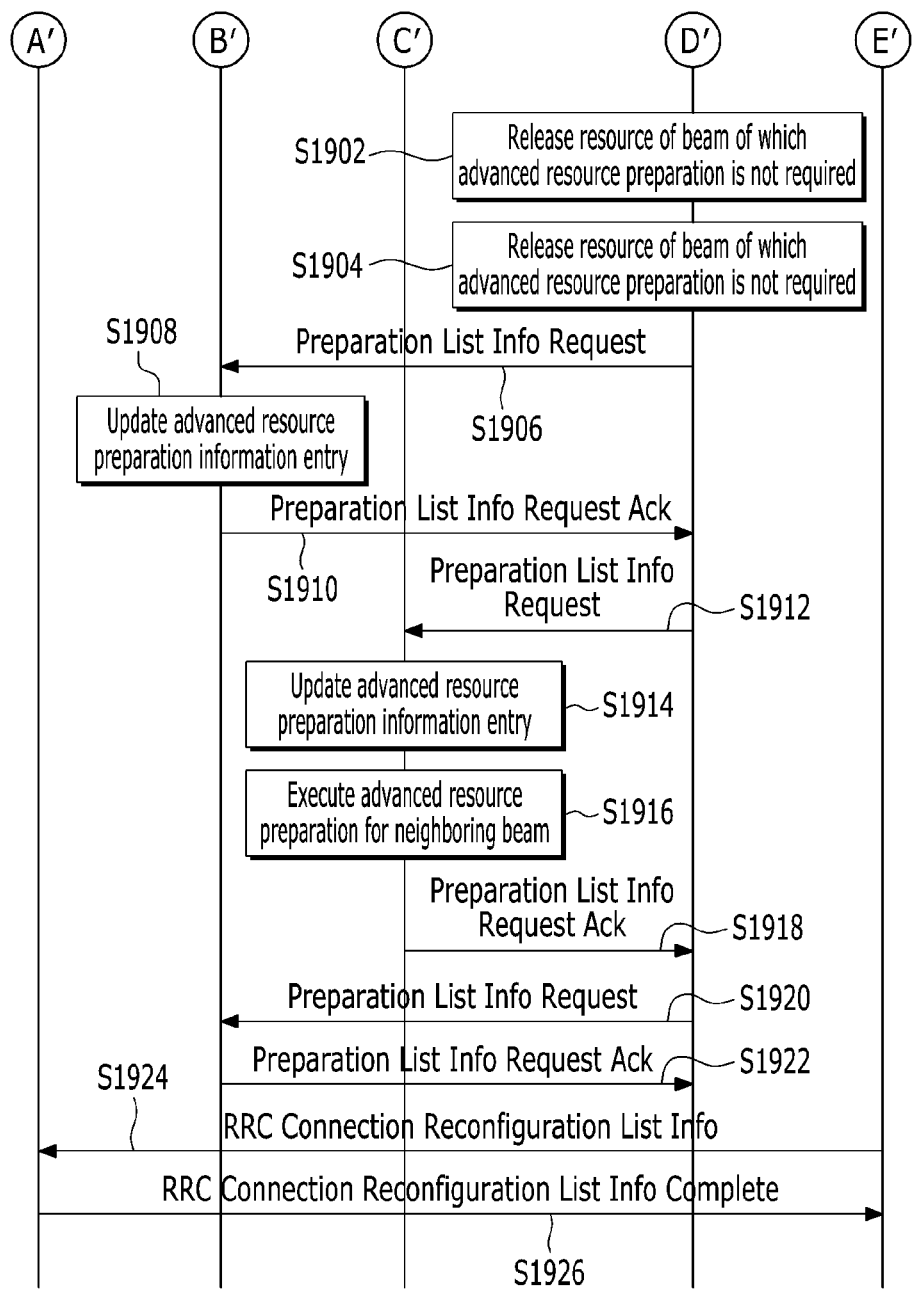

FIGS. 17 to 19 are diagrams illustrating the beam switching procedure illustrated in FIG. 16 in detail.

Referring to FIG. 17, the base station 100*a* that controls the serving beam IDn which the terminal 200 currently accesses determines the advanced resource preparation for the neighboring beams IDj, IDk, IDi, IDh, IDm, and IDl of the serving beam IDn (S1702). The neighboring beams IDj and IDk are controlled by the base station 100*a*, the neighboring beam IDj is controlled by the base station 100*b*, and the neighboring beams IDh, IDm, and IDl are controlled by the base station 100*c*.

When the advanced resource preparation for the neighboring beams IDj and IDk controlled by the base station 100*a* as the serving beam IDn is determined, the base station 100*a* immediately performs the advanced resource preparation for the neighboring beams IDj and IDk. In addition, the base station 100*a* transmits the RRC connection reconfiguration info list including advanced resource preparation information for the neighboring beams IDj and IDk to the terminal 200 through the serving beam IDn (S1704). The advanced resource preparation information for the beams IDj and IDk may include dedicated preamble information for random access to each beam IDj or IDk.

The terminal 200 transmits an RRC connection reconfiguration information list info complete message to the base station 100*a* through the serving beam IDn as a response to the RRC connection reconfiguration list info message (S1706).

Further, when the advanced resource preparation for the neighboring beam IDi controlled by the base station 100*b* other than the base station 100*a* that controls the serving beam IDn is determined, the base station 100*a* transmits an X2AP message such as a preparation list info request to the base station 100*b* (S1708). In this case, the preparation list info request may include the advanced resource preparation information for the serving beam IDn and the neighboring beams IDj and IDk controlled by the base station 100a.

The base station 100b that receives the preparation list info request message executes the advanced resource preparation for the beam IDi (S1710).

When the advanced resource preparation for the beam IDi is completed, the base station 100b transmits the X2AP message such as preparation list info request Ack including the advanced resource preparation for the beam IDi to the base station 100a (S1712). The advanced resource preparation information for the beam IDi may include dedicated preamble information for random access to each beam IDi.

The base station 100a that receives the preparation list information Ack message transmits the RRC connection reconfiguration list info list including the advanced resource preparation information for the beam IDi of which advanced resource preparation is made for the terminal 200 in the base station 100b to the terminal 200 through the serving beam IDn (S1714).

The terminal 200 that receives the RRC connection reconfiguration list info message transmits the RRC connection reconfiguration list info complete message to the base station 100a through the serving beam IDn (S1716).

Further, when the advanced resource preparation for the neighboring beams IDh, IDm, and IDl controlled by the base station 100c other than the base station 100a that controls the serving beam IDn is determined, the base station 100a transmits the preparation list info request message to the base station 100c (S1718). In this case, the preparation list info request message may include the advanced resource preparation information for the serving beam IDn and the neighboring beams IDj and IDk controlled by the base station 100a.

The base station 100c that receives the preparation list info request message executes the advanced resource preparation for the beams IDh, IDm, and IDl (S1720).

When the advanced resource preparation for the beams IDh, IDm, and IDl is completed, the target base station 100c transmits the preparation list info request Ack message including the advanced resource preparation for the beams IDh, IDm, and IDl to the base station 100a (S1722). The advanced resource preparation information for the beams IDh, IDm, and IDl may include dedicated preamble information for random access to each of the beams IDh, IDm, and IDl.

The base station 100a that receives the preparation list information Ack message transmits the RRC connection reconfiguration list info list including the advanced resource preparation information for the beams IDh, IDm, and IDl of which advanced resource preparation is made for the terminal 200 in the base station 100c to the terminal 200 through the serving beam IDn (S1724).

The terminal 200 that receives the RRC connection reconfiguration list info message transmits the RRC connection reconfiguration list info complete message to the base station 100a through the serving beam IDn as a response (S1726).

The base station 100a transmits the preparation list info request message including the advanced resource preparation information for the beam IDi of the base station 100b, which is not possessed by the base station 100c, to the base station 100c (S1728).

The base station 100c that receives the preparation list info request message transmits the preparation list info request Ack message to the base station 100a as a response (S1730).

Further, the base station 100a transmits the preparation list info request message including the advanced resource preparation information for the beams IDh, IDm, and IDl of the base station 100c, which are not possessed by the base station 100b, to the base station 100b (S1732).

The base station 100b that receives the preparation list info request message transmits the preparation list info request Ack message to the base station 100a as a reception response (S1734).

Referring to FIG. 18, the terminal 200 has the advanced resource preparation information for neighboring beams IDj, IDk, IDi, IDh, IDm, and IDl of the serving beam IDn through the steps illustrated in FIG. 17.

The terminal 200 measures signal qualities of the serving beam IDn and the neighboring beams IDj, IDk, IDi, IDh, IDm, and IDl and determines the optimal target beam while comparing the signal qualities of the beams (S1802). It is assumed that the target beam IDh determined by the terminal 200 is a beam controlled by the base station 100c other than the base station 100 that controls the serving beam IDg. Hereinafter, the base station 100c is referred to as the target base station.

The terminal 200 transmits the RRC status indication message to the base station 100a through the serving beam IDn (S1804) to notify the base station 100a that the terminal 200 moves to the target beam IDh to the target base station 100c. Transmission of the RRC status indication message may be omitted.

The base station 100a that receives the RRC status indication message recognizes that the terminal 200 moves from the serving beam IDn to the target beam IDh of another target base station 100c, and processes forwarding of the downlink traffic or/and the received uplink traffic to the serving beam IDn from the serving beam IDn to the target beam IDf of the base station 100c (S1806).

Further, the base station 100a transmits the X2AP such as SN status transfer including sequence number (SN) status information to the target beam IDf of the target base station 100c for lossless data handover (S1808). The SN status information may include an SN which the target base station 100c will set in next packet transmission and SN information which the terminal 200 may not receive.

When the terminal 200 determines movement of the radio access link from the serving beam IDn of the base station 100a to the target beam IDh of the target base station 100c, the terminal 200 transmits a dedicated preamble corresponding to the target beam IDh from the advanced resource preparation information to the target base station 100c through the target beam IDh (S1810).

The target base station 100c that receives the dedicated preamble corresponding to the target beam IDh verifies whether the dedicated preamble corresponding to the target beam IDh is an advancingly reserved preamble, and when the corresponding dedicate preamble is the advancingly reserved preamble, the target base station 100c transmits the random access response (PAR) to the terminal 200 through the target beam IDh (S1812).

The terminal 200 that receives the random access response (PAR) transmits the RRC connection reconfiguration complete message to the base station 100 (S1814) to complete a new radio access configuration in the target beam IDh. The RRC connection reconfiguration complete message may include information that the terminal 200 moves from the serving beam IDn to the target beam IDh.

The target base station 100c transmits the X2AP such as an anchor change request message to the base station 100a through the beam IDh (S1816) to request data forwarding from the beam IDn of the base station 100a.

The base station 100a that receives the anchor change request message recognizes that the terminal 200 moves from the beam IDn to the beam IDh of the target base station 100c and performs traffic forwarding from the beam IDn to the beam IDh. In this case, when the traffic forwarding from the beam IDn to the beam IDh has already been performed in step S1806, the traffic forwarding need not be performed again.

Further, the base station 100a may transmit the SN status transfer message to the base station 100c through the target beam IDf for the lossless data handover. When such a process has also already been performed in step S1808, transmission of the SN status transfer message also does not need to be performed.

When the terminal 200 moves from the beam IDf controlled by the base station 100a to the beam IDh controlled by the target base station 100c, traffic path information is changed, and when downlink traffic path information is changed by beam movement, the base station 100c may transmit path switch information to the MME 300 through a path switch request message (S1818).

The MME 300 that receives the path switch request message updates the changed downlink traffic path information and transmits a path switch request Ack message to the base station 100c as a response to the path switch request message (S1820). In this case, when even the MME 300 intends to change uplink traffic path information, the changed uplink traffic path information may be included in the path switch request Ack message.

Next, referring to FIG. 19, when movement of the terminal 200 from the serving base station 100a to the beam IDh of the target base station 100c is completed, the base station 100c becomes the serving base station 100c.

The serving base station 100c reviews whether the advanced resource preparation is not required with respect to beams of which advanced resource preparation is made based on the previously accessed beam IDg, and performs resource release for the beams of which the advanced resource preparation is not required (S1902).

In addition, the serving base station 100c may review beams of which advanced resource preparation is newly required among neighboring beams of the newly accessed beam IDh, and determine and execute the advanced resource preparation for the new beams of which advanced resource preparation is required (S1904).

For example, neighboring beams of the beam IDh to which the terminal 200 moves include the beams IDn, IDm, IDi, IDx, IDw, and IDv. Accordingly, the beams IDj and IDk of the base station 100a and the beam IDl of the base station 100c among the beams IDj, IDk, IDi, IDh, IDm, and IDl of which advanced resource preparation is made based on the previous beam IDn correspond to the beams of which advanced resource preparation is not required. Accordingly, the serving base station 100c may determine the resource release with respect to the beams IDj and IDk of the base station 100a and the beam IDl of the base station 100c. In addition, since the beams IDv and IDw of the base station 100b and the beam IDx of the base station 100c are not the beams IDj, IDk, IDi, IDh, IDm, and IDl of which advanced resource preparation is made based on the previous beam IDn, the beams IDv and IDw of the base station 100b and the beam IDx of the base station 100c correspond to the beams of which advanced resource preparation is newly required. Accordingly, the serving base station 100c may determine the advanced resource preparation with respect to the beams IDv and IDw of the base station 100b and the beam IDx of the base station 100c and execute the advanced resource preparation.

The serving base station 100c adds the corresponding information to each of the release list and the addition modification list, and transmits the preparation list info request message including the release and addition modification lists to the base station 100a (S1906). Information on the beams IDj and IDk of the base station 100a and the beam IDl of the base station 100c may be added to the release list and the advanced resource preparation information for the beam IDx of the serving base station 100c may be added to the addition modification list.

The base station 100a that receives the preparation list info request message executes the advanced resource preparation information entry (S1908). That is, the base station 100a releases the advancingly prepared resource of the beams IDj and IDk included in the release list, deletes the advanced resource preparation information of the beams IDj, IDk, and IDl from the advanced resource preparation information entry, and adds the beam IDx included in the addition modification list to the advanced resource preparation information entry.

The base station 100a transmits the preparation list info request Ack message to the serving base station 100c as a response to the preparation list info request message (S1910).

Similarly, the serving base station 100c adds the corresponding information to each release list, transmits the corresponding information to the base station 100b by using the addition modification list, and transmits the preparation list info request message including the release and addition modification lists (S1912). The information on the beams IDj and IDk of the base station 100a and the beam IDl of the base station 100c may be added to the release list, and the advanced resource preparation information for the beam IDx of the serving base station 100c may be added to the addition modification list.

The base station 100b that receives the preparation list info request message executes the advanced resource preparation information entry (S1914). That is, the base station 100b releases the advancingly prepared resource of the beams IDj and IDk included in the release list, deletes the advanced resource preparation information of the beams IDj, IDk, and IDl from the advanced resource preparation information entry, and adds the beam IDx included in the addition modification list to the advanced resource preparation information entry.

In addition, the base station 100b may recognize that the terminal 200 moves to the beam IDh of the base station 100c through the preparation list info request message. Accordingly, the base station 100b executes the advanced resource preparation with respect to the neighboring beams IDv and IDw of the beam IDh controlled thereby (S1916).

The base station 100b transmits the preparation list info request Ack message including the advanced resource preparation information of the beams IDv and IDw of which advanced resource preparation is newly made to the serving base station 100c as a response to the preparation list info request message (S1918).

The serving base station 100c adds the advanced resource preparation information of the beams IDv and IDw of the base station 100b, of which advanced resource preparation is newly made, to the addition modification list and transmits the preparation list info request message including the addition modification list to the base station 100a (S1920).

The base station 100a transmits the preparation list info request Ack message to the serving base station 100c as a response to the preparation list info request message (S1922). The preparation list info request Ack message may include information that the advanced resource preparation information of the beams IDv and IDw of the base station 100b is added to the advanced resource preparation information entry.

The serving base station 100c processes advanced resource preparation information of the beams of which resource release is required and a new beam in the advanced resource preparation information of each beam to add the information on the beams of which source release is required to the release list, and adds the advanced resource preparation information of the new beam to the addition modification list.

The serving base station 100c transmits the RRC connection reconfiguration info list message including the release list and the addition change list to the terminal 200 through the serving beam IDh (S1924).

The terminal 200 that receives the RRC connection reconfiguration info list message updates the advanced resource preparation information entry of each beam. The terminal 200 deletes information on the beams of which resource release is required from the advanced resource preparation information entry of each beam controlled thereby, and adds or modifies the advanced resource preparation information of the beams of which advanced resource preparation is newly made.

Next, the terminal 200 transmits RRC connection reconfiguration information list complete message to the serving base station 100c as a response of the RRC connection reconfiguration info list (S1926).

Hereinabove, the beam switching in the same base station and the beam switching in different base stations have been described. Hereinafter, a beam switching procedure among different systems will be described.

Figure 20:
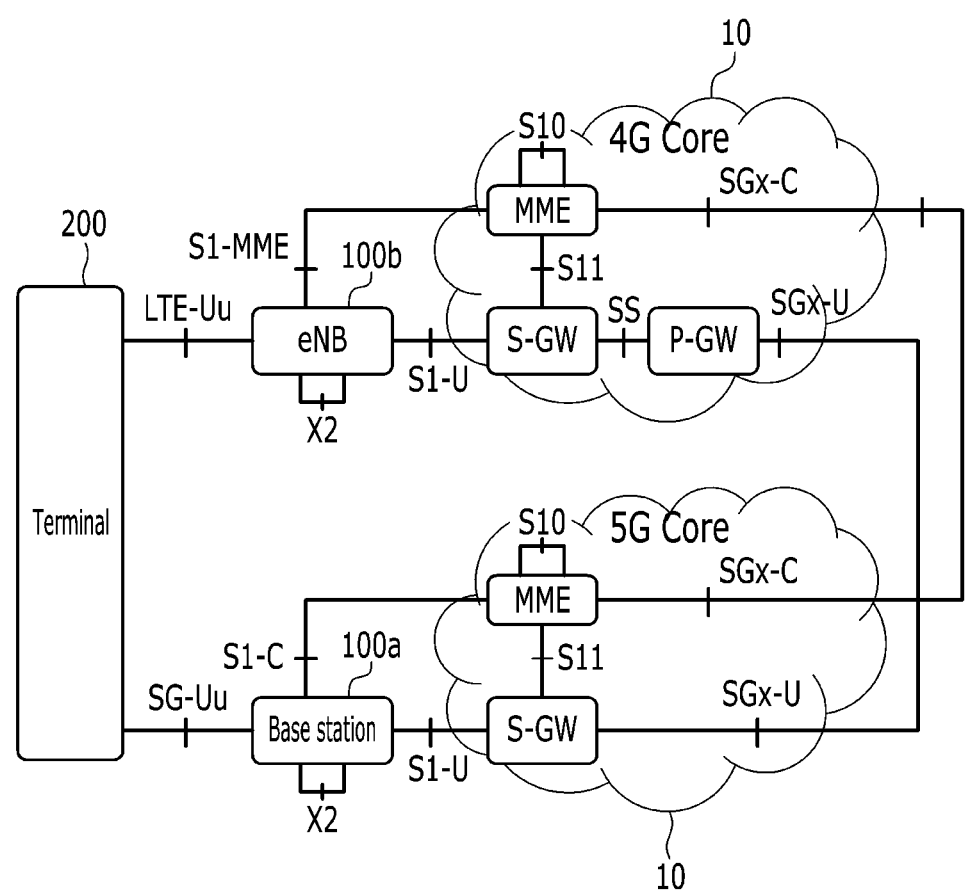
FIG. 20 is a diagram illustrating one example of a system model for describing beam switching between different systems according to the exemplary embodiment of the present invention.

FIG. 20 is a diagram illustrating one example of a system model for describing beam switching between different systems according to the exemplary embodiment of the present invention.

As illustrated in FIG. 20, a core network to which a 5G system including the base station 100a using a millimeter-wave based ultra band according to the exemplary embodiment of the present invention is connected is defined as a 5G core 10 and a core network of a 4G system such as the existing LTE system is defined as a 4G core 20. Based on the system model, a handover procedure from the 5G system to the 4G system and a handover procedure from the 4G system to the 5G system will be described in detail with reference to FIGS. 21 and 22.

Figure 21:
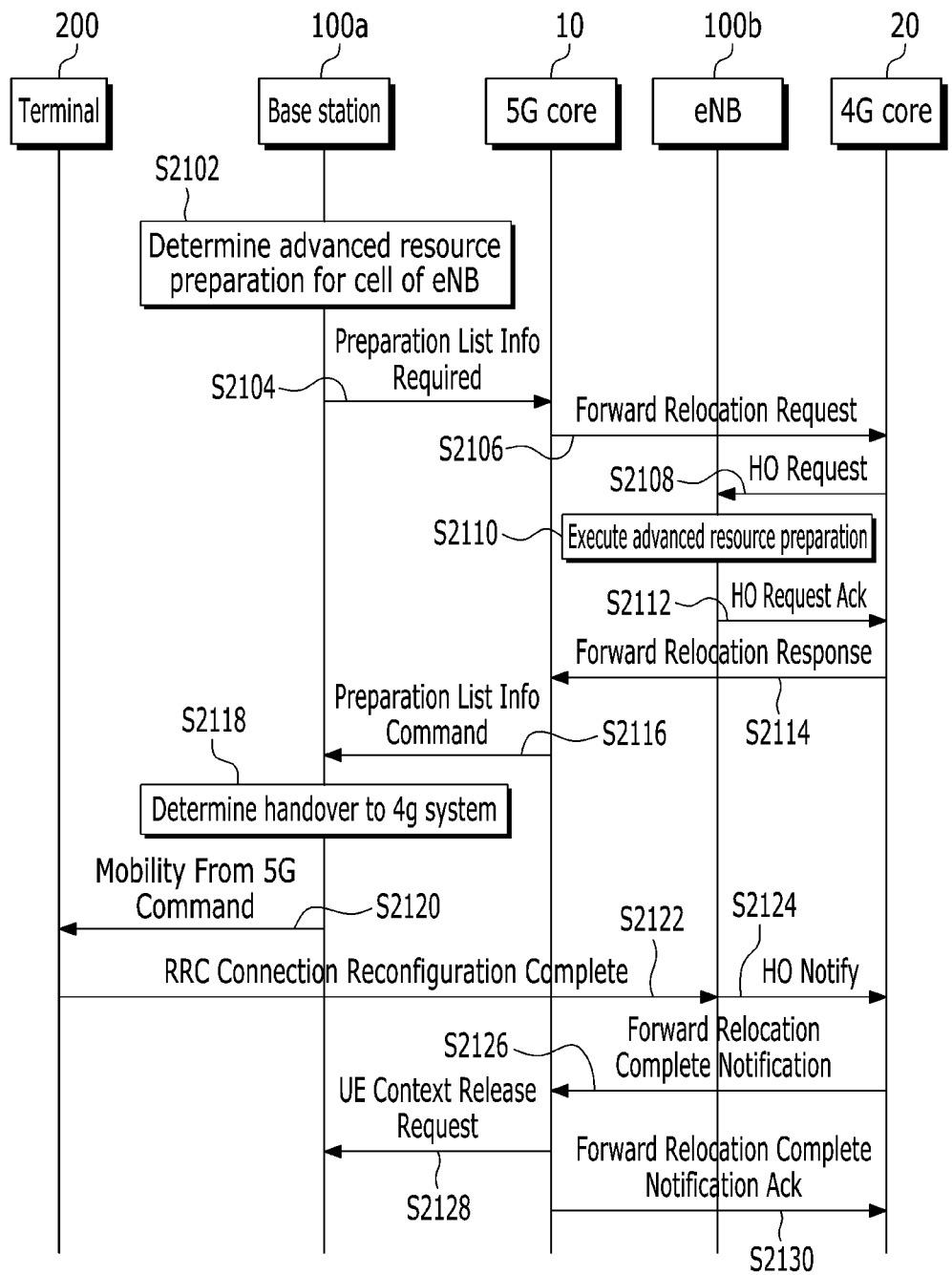
FIG. 21 is a diagram illustrating a handover procedure from a 5G system to a 4G system based on the system model of FIG. 20.

FIG. 21 is a diagram illustrating a handover procedure from a 5G system to a 4G system based on the system model of FIG. 20.

Referring to FIG. 21, while the terminal 200 transmits and receives data by accessing one beam controlled by the base station 100a of the 5G system, the base station 100a may determine movement to the 4G system based on a configured event, and the like. The event may mean a case in which a signal strength of a cell controlled by a base station (hereinafter referred to as "eNB") 100b of the 4G system is larger than a set threshold. Further, the event may mean a case in which a primary cell (PCell) among cells controlled by the base station 100a of the 5G system is smaller than a set threshold and the signal strength of the cell controlled by the eNB 100b of the 4G system is larger than a set threshold. In this case, the set thresholds may be different values.

When the configured event occurs, the base station 100a determines advanced resource preparation for the cell controlled by the eNB 100b of the 4G system, which causes the event (S2102). The advanced resource preparation may be determined by integrally judging a measurement basis or/and information such as OAM/history/terminal velocity, and the like.

The base station 100a transmits an S1AP message such as preparation list info required to the 5G core 10 according to determination of advanced resource preparation for a predetermined cell of the eNB 100b (S2104). For example, assuming that the terminal 200 resides in cell a of the base station 100a, when the signal strength of a cell (x, y) controlled by the eNB 100b of the 4G system is larger than a set threshold at the position of the terminal 200 in cell a, the base station 100a may determine the advanced resource preparation for the cell (x, y). The 5G core 10 transmits an SGx-C message such as a forward relocation request to the 4G core 20 by finding the corresponding 4G core 20 (S2106).

The 4G core 20 transmits an LTE-S1AP such as a handover (HO) request to the eNB 100b (S2108).

The eNB 100b processes effective information required for handover to the corresponding cell and executes the advanced resource preparation such as determining a dedicated preamble that will randomly access the cell thereof (S2110). The effective information may include, for example, target cell information of the 4G system which the terminal will access.

The eNB 100b transmits to the 4G core 20 the LTE-S1AP message such as a handover (HO) request Ack including the advanced resource preparation information for the corresponding cell of the eNB 100b (S2112).

The 4G core 20 transmits the SGx-C message such as a forward relocation response to the 5G corer 10 as a response to a forward relocation request message (S2114).

The 5G core 10 transmits the S1AP message such as a preparation list info command to the base station 100a (S2116).

The base station 100a determines handover to the corresponding cell of the eNB 100b of the 4G system, of which advanced resource preparation is made (S2118).

When the base station 100a determines handover to the corresponding cell of the eNB 100b of the 4G system, of which advanced resource preparation is made, the base station 100a transmits an RRC message such as a mobility command (mobilityfrom5GCommand) to the terminal 200 (S2120). The mobility command may include information notifying that the terminal 200 moves from the 5G system to the 4G system.

The terminal 200 transmits the dedicated preamble corresponding to the corresponding cell of the eNB 100b to the eNB 100b, and receives a random access response (PAR) from the eNB 100b to complete a random access procedure to the corresponding cell of the eNB 100b.

Next, the terminal 200 transmits an LTE-RRC message such as RRC connection reconfiguration complete to the eNB 100b of the corresponding 4G system (S2122).

The eNB 100b transmits an LTE-S1AP message such as handover (HO) notify to the 4G core 20 (S2124).

The 4G core 20 transmits the SGx-C message such as forward relocation complete notification notifying that relocation is completed to the 5G core 10 (S2126).

The 5G core 10 transmits the S1AP message such as a UE context release request to the base station 100a in order to delete a terminal context of the corresponding base station 100a (S2128).

Further, the 5G core 10 transmits the SGx-C message such as forward relocation complete notification Ack to the 4G core 20 as a response to the forward relocation complete notification message (S2130).

Figure 22:
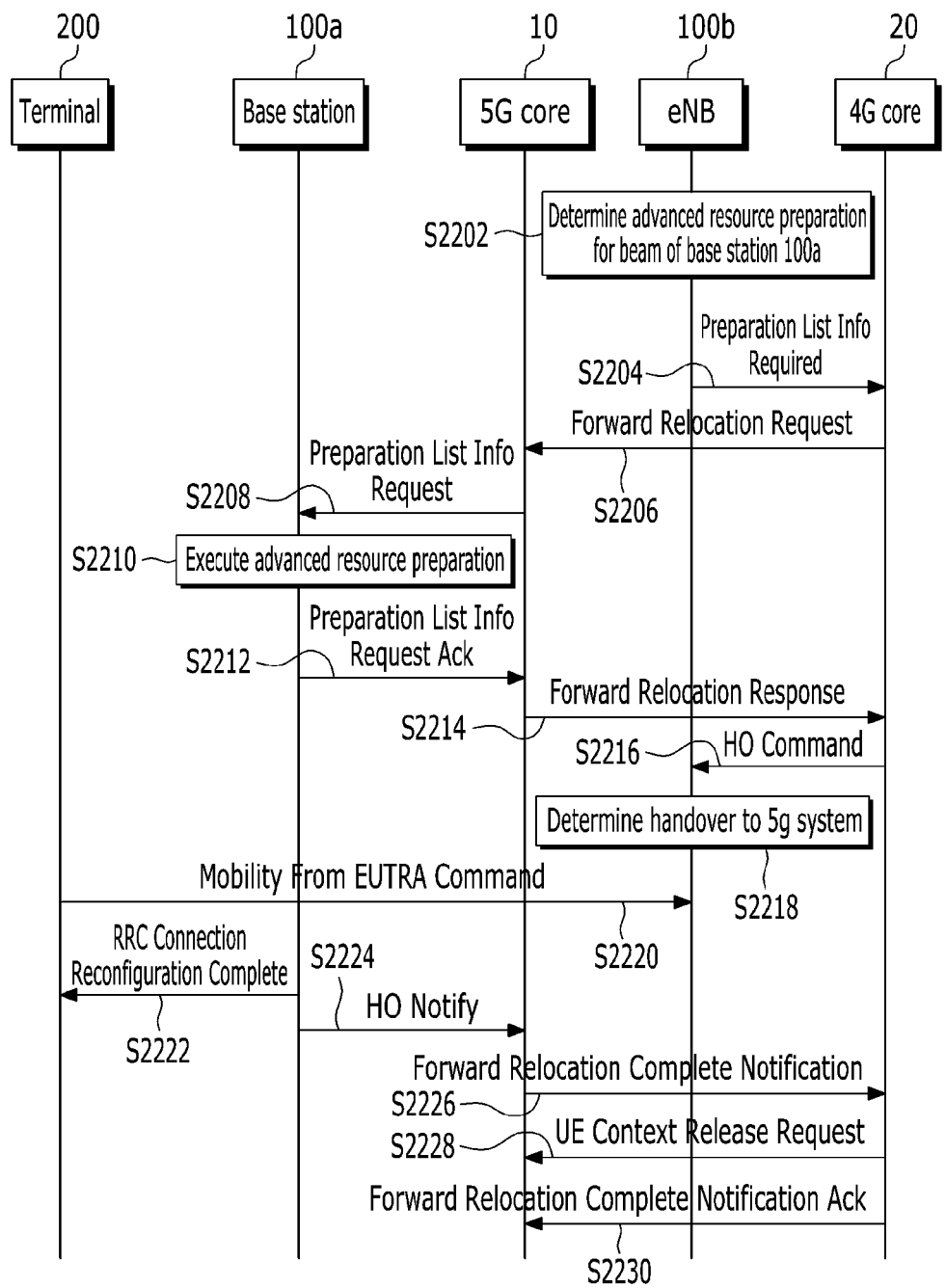
FIG. 22 is a diagram illustrating a handover procedure from the 4G system to the 5G system based on the system model of FIG. 20.

FIG. 22 is a diagram illustrating a handover procedure from the 4G system to the 5G system based on the system model of FIG. 20.

Referring to FIG. 22, while the terminal 200 transmits and receives data by accessing one beam controlled by the eNB 100b of the 4G system, the eNB 100b may determine movement to the 5G system based on the configured event and the like.

When the configured event occurs, the eNB 100b determines advanced resource preparation for a beam controlled by the base station 110a of the 5G system, which causes the event (S2202). The advanced resource preparation may be determined by integrally judging a measurement basis or/and information such as OAM/history/terminal velocity, and the like.

The eNB 100b transmits the LTE-S1AP message such as the preparation list info required to the 4G core 20 according to determination of advanced resource preparation for a predetermined beam of the base station 100a of the 5G system (S2204).

The 4G core 20 transmits the forward relocation request to the 5G core 10 by finding the corresponding 5G core 10 (S2206).

The 5G core 10 transmits the S1AP message such as the preparation list info request to the base station 100a (S2208).

The base station 100a processes effective information required for handover to the corresponding beam, and executes the advanced resource preparation such as determining a dedicated preamble that will randomly access the beam thereof (S2210). The effective information may include, for example, information on the beam which the terminal will access.

The base station 100a transmits the S1AP message such as the preparation list info request Ack including the advanced resource preparation information of the corresponding beam of the base station 100a to the 5G core 10 (S2212).

The 5G core 10 transmits the SGx-C message such as the forward relocation response to the 4G core 20 (S2214).

The 4G core 20 transmits an LTE-S1AP such as the handover (HO) command to the eNB 100b (S2216).

The eNB 100b determines handover to the corresponding beam of the base station 100a of the 5G system, of which advanced resource preparation is made (S2218).

When the eNB 100b determines handover to the corresponding beam of the base station 100a of the 5G system, the eNB 100b transmits an LTE-RRC message such as a mobility command (MobilityFromEUTRACommand) to the terminal 200 (S2220). The mobility command may include information notifying that the terminal 200 moves from the 4G system to the 5G system.

The terminal 200 transmits the dedicated preamble of the corresponding beam of the base station 100a to the eNB 100b, and receives the random access response (PAR) from the base station 100a to complete the random access procedure to the corresponding beam of the base station 100a. Next, the terminal 200 transmits the RRC message such as the RRC connection reconfiguration complete to the base station 100a through the corresponding beam of the base station 100a of the 5G system (S2222).

The base station 100a transmits the S1AP message such as the handover (HO) notification to the 5G core 10 (S2224).

The 5G core 10 transmits the SGx-C message such as the forward relocation complete notification notifying that relocation is completed to the 4G core 20 (S2226).

The 4G core 20 transmits the LTE-S1AP message such as the UE context release request to the base station 100a to the eNB 100b in order to delete the terminal context of the eNB 100b (S2228).

Further, the 4G core 20 transmits the SGx-C message such as the forward relocation complete notification Ack to the 5G core 10 as the response to the forward relocation complete notification message (S2230).

Meanwhile, a failure may occur in the radio access link accessed by the terminal 200. When the radio link failure (RLF) occurs, the terminal 200 performs an RLF recovery procedure. The RLF recovery procedure will be described in detail with reference to FIGS. 23 to 26.

Figure 23:
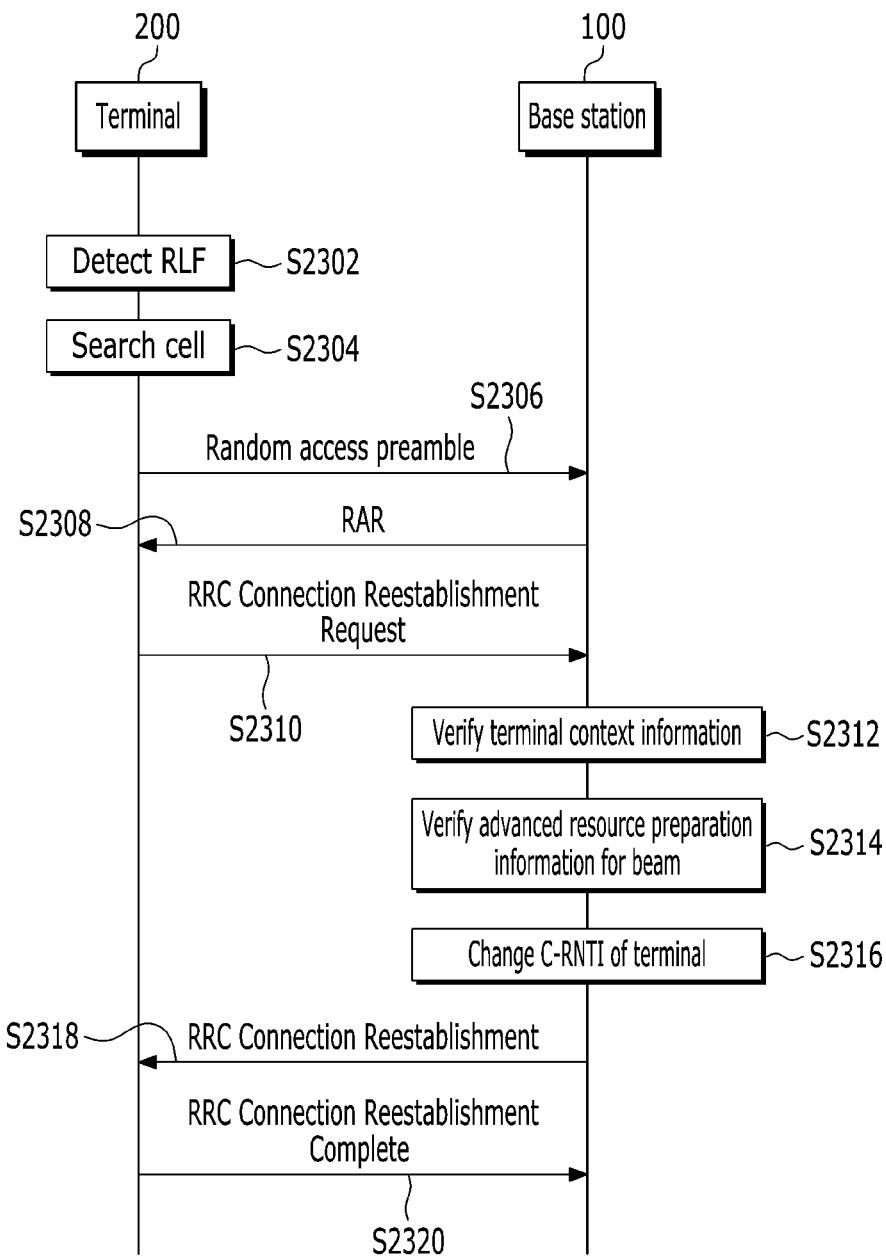
FIG. 23 is a diagram illustrating a radio link failure recovery procedure of the same beam of the same base station when a radio link failure occurs according to the exemplary embodiment of the present invention.

FIG. 23 is a diagram illustrating a radio link failure recovery procedure of the same beam of the same base station when a radio link failure occurs according to the exemplary embodiment of the present invention.

Referring to FIG. 23, when the RLF occurs while the terminal 200 transmits and receives data by accessing the serving beam IDf of the serving base station 100, the terminal 200 may attempt the RLF recovery by reselecting the same beam IDg of the same base station 100 while reselecting the beam.

In detail, the terminal 200 accesses the serving beam IDg of the base station 100 to transmit and receive data.

When the terminal 200 detects the RLF (S2302), the terminal 200 performs beam searching for substantial RLF recovery (S2304). In addition, as a result of the beam searching, the terminal 200 may reselect the beam IDg which was the serving beam IDg.

The terminal 200 randomly selects the random access preamble from a random access preamble pool of the beam IDg received from the base station 100 through the system information, and transmits the selected random access preamble through the beam IDg of the base station 100 (S2306) to attempt a random access.

When the base station 100 receives the random access preamble, the base station 100 transmits the random access response (PAR) which is a response to the received random access preamble to the terminal 200 (S2308).

The terminal 200 transmits an RRC connection reestablishment request message through the beam IDg of the base station 100 (S2310).

The base station 100 verifies whether there is a corresponding terminal context by using a logical UE-ID included in the RRC connection reestablishment request message (S2312). Further, the base station 100 verifies whether there is advanced resource preparation information for the beam IDg (S2314).

In this case, since the terminal 200 attempts the RLF recovery to the serving beam IDg of the serving base station 100, the terminal context exists in the base station 100 and the base station 100 even has the advanced resource preparation information for the corresponding beam IDg.

When the base station 100 has the terminal context and the advanced resource preparation information for the beam IDg, since the terminal 200 attempts the random access based on a collision with an RNTI configured in the serving beam IDg, the base station 100 performs the beam configuration of the base station 100 again by changing a C-RNTI of the terminal 200 (S2316).

The base station 100 transmits an RRC connection reestablishment message including changed context information of the terminal to the terminal 200 (S2318).

The terminal 200 transmits an RRC connection reestablishment complete message to the base station 100 through the beam IDg as a response to the RRC connection reestablishment message (S2320).

Figure 24:
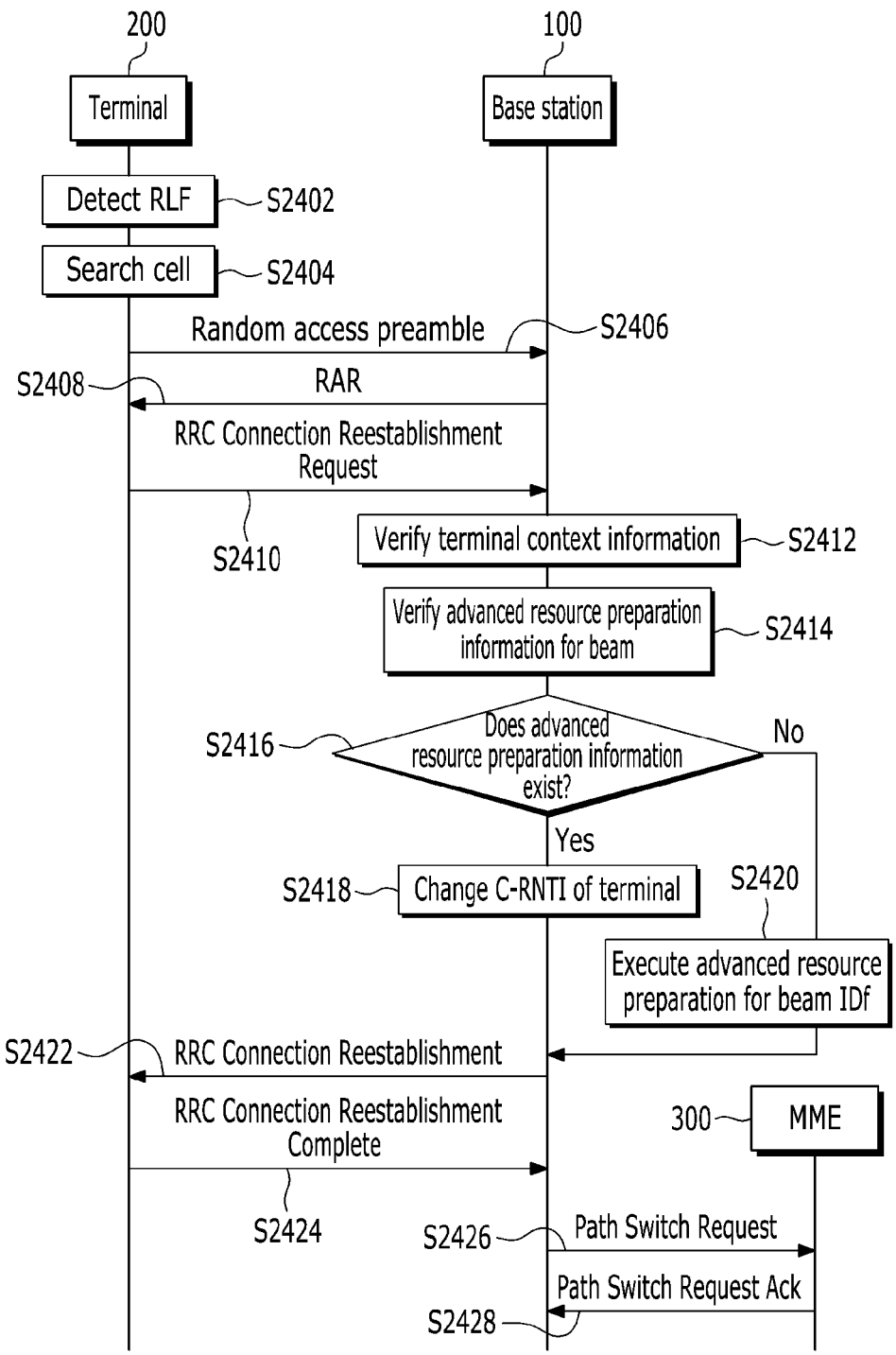
FIG. 24 is a diagram illustrating the radio link failure recovery procedure of another beam of the same base station when a radio link failure occurs according to an exemplary embodiment of the present invention.

FIG. 24 is a diagram illustrating the radio link failure recovery procedure for another beam of the same base station when a radio link failure occurs according to the exemplary embodiment of the present invention.

Referring to FIG. 24, when the RLF occurs while the terminal 200 transmits and receives data by accessing the service beam IDg of the base station 100*a*, the terminal 200 may attempt the RLF recovery by reselecting another beam of the same base station 100 while reselecting the beam.

In detail, the terminal 200 transmits and receives the data by accessing the serving beam IDg of the base station 100.

When the terminal 200 detects the RLF (S2402), the terminal 200 performs the beam searching for the substantial RLF recovery (S2404). In addition, as the result of the beam searching, the terminal 200 may reselect the beam IDf of the base station 100, which is different from the serving beam IDg, before detecting the RLF.

The terminal 200 randomly selects the random access preamble from the random access preamble pool of the corresponding beam IDf received from the base station 100 through the system information (S2406), and transmits the selected random access preamble through the beam IDf of the base station 100 (S2408) to attempt the random access.

When the base station 100 receives the random access preamble, the base station 100 transmits the random access response (PAR) which is the response to the received random access preamble to the terminal 200 (S2408).

The terminal 200 transmits the RRC connection reestablishment request message through the beam IDf of the base station 100 (S2410).

The base station 100 verifies whether there is the corresponding terminal context by using the logical UE-ID included in the RRC connection reestablishment request message (S2412). Further, the base station 100 verifies whether there is the advanced resource preparation information for the beam IDg (S2414).

Since the terminal 200 attempts the RLF recovery to the base station 100, the terminal context may exist in the base station 100. However, since the terminal 200 attempts the RLF recovery to the beam IDf different from the serving beam IDg of the base station, the advanced resource preparation for the beam IDf may or may not be made through the aforementioned advanced resource preparation procedure.

When the advanced resource preparation information for the beam IDf exists (S2416), since the terminal 200 attempts the random access based on the collision, the base station 100 performs the beam configuration of the base station 100 again by changing the C-RNTI of the terminal 200 (S2418).

Meanwhile, when the advanced resource preparation information for the beam IDf exists (S2416), the base station 100 executes the advanced resource preparation with a new RNTI for the beam IDf (S2420).

The base station 100 transmits the RRC connection reestablishment message including changed or newly configured context information of the terminal 200 to the terminal 200 (S2422).

The terminal 200 transmits the RRC connection reestablishment complete message to the base station 100 through the beam IDf as the response to the RRC connection reestablishment message (S2424).

Although the terminal 200 moves from the beam IDg controlled by the base station 100 to the beam IDf, traffic path information may be changed, and when downlink traffic path information is changed by beam movement, the base station 100 may transmit the path switch information to the MME 3000 through the path switch request message (S2426).

The MME 300 that receives the path switch request message updates the changed downlink traffic path information and transmits the path switch request Ack message to the base station 100*c* as the response of the path switch request message (S2428). In this case, when even the MME 300 intends to change uplink traffic path information, the changed uplink traffic path information may be included in the path switch request Ack message.

In addition, according to the method described in the aforementioned handover method, as the terminal 200 moves from the beam IDg to the beam IDf, the advanced resource preparation procedure and an advancingly prepared resource release procedure may be performed.

Figure 25:
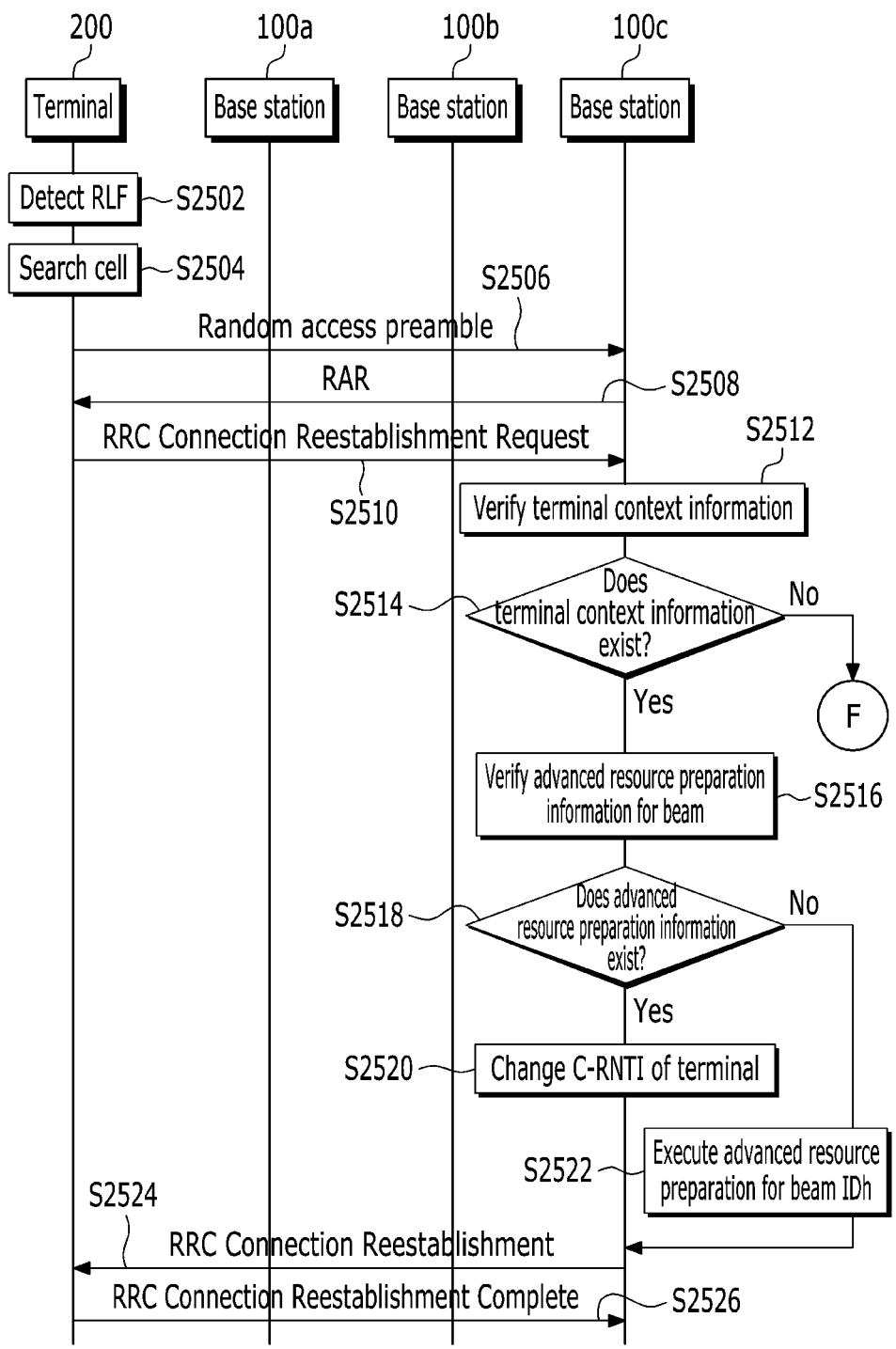
FIG. 25 is a diagram illustrating the radio link failure recovery procedure of a beam of another base station when a radio link failure occurs according to the exemplary embodiment of the present invention.

FIG. 25 is a diagram illustrating the radio link failure recovery procedure to a beam of another base station when a radio link failure occurs according to the exemplary embodiment of the present invention.

Referring to FIG. 25, when the RLF occurs while the terminal 200 transmits and receives data by accessing the beam IDn of the base station 100*a*, the terminal 200 may attempt the RLF recovery by reselecting the beam IDh of another base station 100*c* while reselecting the beam.

In detail, the terminal 200 accesses the serving beam IDn of the base station 100*a* to transmit and receive data.

When the terminal 200 detects the RLF (S2502), the terminal 200 performs the beam searching for the substantial RLF recovery (S2504). In addition, as the result of the beam searching, the terminal 200 may reselect the beam IDh of the base station 100*c*.

The terminal 200 randomly selects the random access preamble from the random access preamble pool of the beam IDh received from the base station 100*c* through the system information, and transmits the selected random access preamble through the beam IDh of the base station 100*c* (S2506) to attempt the random access.

When the base station 100*c* receives the random access preamble, the base station 100*c* transmits the random access response (PAR), which is the response to the received random access preamble, to the terminal 200 (S2508).

The terminal 200 transmits the RRC connection reestablishment request message through the beam IDh of the base station 100*c* (S2510).

The base station 100*c* verifies whether there is the corresponding terminal context by using the logical UE-ID included in the RRC connection reestablishment request message (S2512). Since the terminal 200 attempts the RLF recovery not to the serving base station 100*a* but to another base station 100*c*, the terminal context may exist or not in the base station 100*c*.

In FIG. 25, the case in which the terminal context exists in the base station 100*c* is described, and the case in which the terminal context does not exist in the base station 100*c* will be described through FIG. 26.

When the terminal context exists in the base station 100*c* 9S2514), the base station 100*c* verifies whether there is the advanced resource preparation information for the beam IDf (S2516). The advanced resource preparation for the beam IDf may or may not be made through the aforementioned advanced resource preparation procedure.

When the advanced resource preparation information for the beam IDh exists (S2518), since the terminal 200 attempts the random access based on the collision, the base station 100c performs the beam configuration of the base station 100 again by changing the C-RNTI of the terminal 200 (S2520).

Meanwhile, when the advanced resource preparation information for the beam IDh exists (S2518), the base station 100c executes the advanced resource preparation with a new RNTI for the beam IDf (S2522).

The base station 100c transmits the RRC connection reestablishment message including changed or newly configured context information of the terminal 200 to the terminal 200 (S2524).

The terminal 200 transmits the RRC connection reestablishment complete message to the base station 100c through the beam IDh as the response to the RRC connection reestablishment message (S2526).

In addition, as described above, when the terminal 200 moves from the beam IDn controlled by the base station 100a to the beam IDh controlled by another base station 100c, the traffic path information is changed, and when the downlink traffic path information is changed by beam movement, the base station 100c may transmit path change information to the MME through the path switch request message.

In addition, the MME that receives the path switch request message updates the changed downlink traffic path information and transmits the path switch request Ack message to the base station 100c as the response of the path switch request message. In this case, when even the MME intends to change uplink traffic path information, the changed uplink traffic path information may be included in the path switch request Ack message.

In addition, according to the method described in the aforementioned handover method, as the terminal 200 moves from the beam IDn controlled by the base station 100a to the beam IDh controlled by another base station 100c, the advanced resource preparation procedure and the advancingly prepared resource release procedure may be performed.

Figure 26:
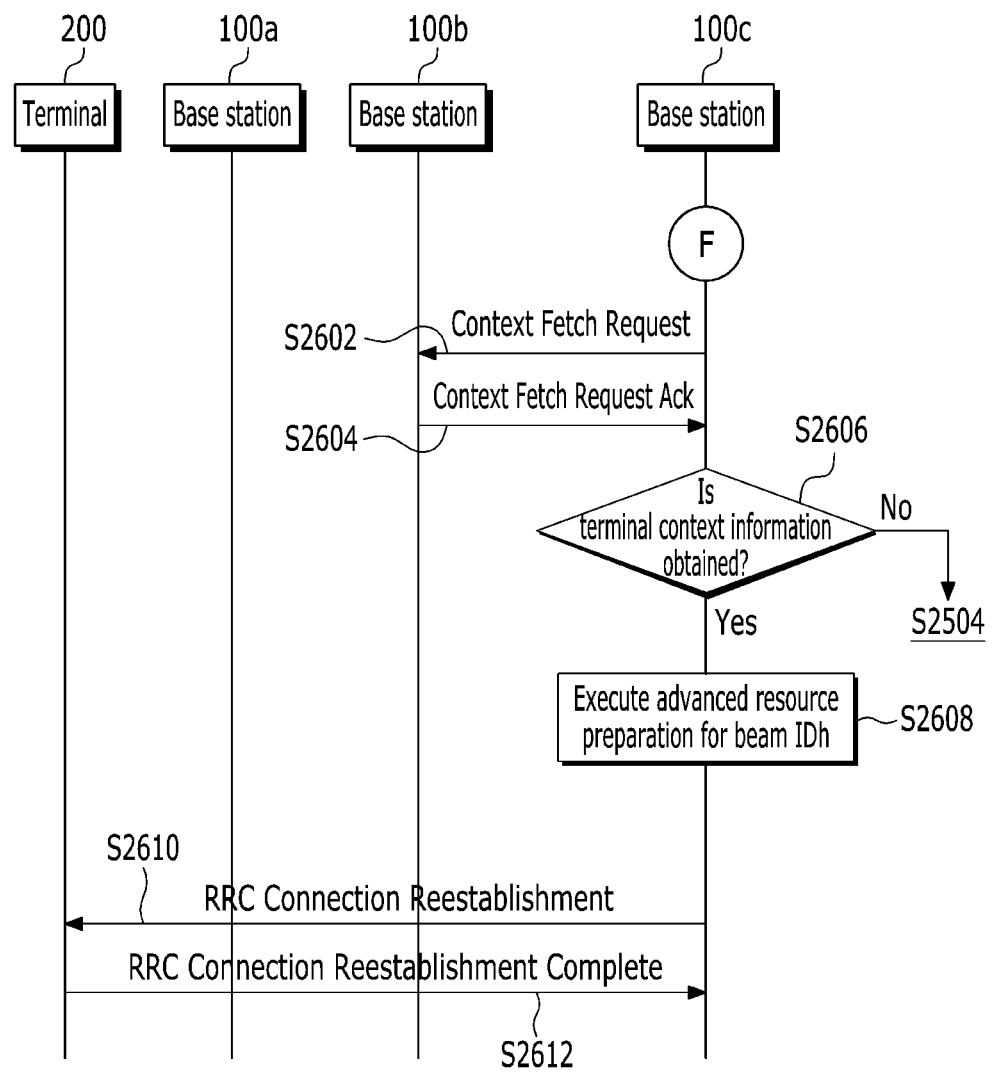
FIG. 26 is a diagram illustrating the radio link failure recovery procedure of the beam of another base station when the radio link failure occurs according to another exemplary embodiment of the present invention.

FIG. 26 is a diagram illustrating the radio link failure recovery procedure to the beam of another base station when the radio link failure occurs according to another exemplary embodiment of the present invention.

Referring to FIG. 26, the base station 100c may request the advanced resource preparation information of the corresponding terminal 200 from the neighboring base station (e.g., 100b) when the terminal context does not exist. To this end, the base station 100c transmits an X2AP message such as a context fetch request to the neighboring base station 100b (S2602).

The neighboring base station 100b that receives the context fetch request verifies whether a terminal context corresponding to a UE-ID in the message exists, and transmits the X2AP message such as context fetch request Ack to the base station 100c as a response to the context fetch request (S2604). When the terminal context corresponding to the UE identifier (UE-ID) exists, the neighboring base station 100b may transmit the context fetch request Ack including the corresponding terminal context information.

When the base station 100c fails to obtain the terminal context information from the neighboring base station 100b (S2606), the base station 100c performs the beam searching step (S2504 of FIG. 25).

On the contrary, when the base station 100c succeeds in obtaining the terminal context information from the neighboring base station 100b (S2606), the base station 100c executes the advanced resource preparation for the beam IDh of the base station 100c with the new RNTI allocated through the random access response (RAR) (S2608).

The base station 100c transmits the RRC connection reestablishment message including the newly configured context information of the terminal 200 to the terminal 200 through the beam IDh (S2610).

The terminal 200 transmits the RRC connection reestablishment complete message to the base station 100c through the beam IDh as the response to the RRC connection reestablishment message (S2612).

When the terminal 200 moves from the beam IDn controlled by the base station 100a to the beam IDh controlled by another base station 100c, the traffic path information is changed, and when the downlink traffic path information is changed by beam movement, the base station 100c may transmit the path switch information to the MME through the path switch request message.

Further, the MME that receives the path switch request message updates the changed downlink traffic path information and transmits the updated downlink traffic path information to the base station 100c through the path switch request Ack message as the reception response. In this case, when even the MME intends to change uplink traffic path information, the changed uplink traffic path information may be included in the path switch request Ack message.

In addition, according to the method described in the aforementioned handover method, as the terminal 200 moves from the beam IDn controlled by the base station 100a to the beam IDh controlled by another base station 100c, the advanced resource preparation procedure and the advancingly prepared resource release procedure may be performed.

Figure 27:
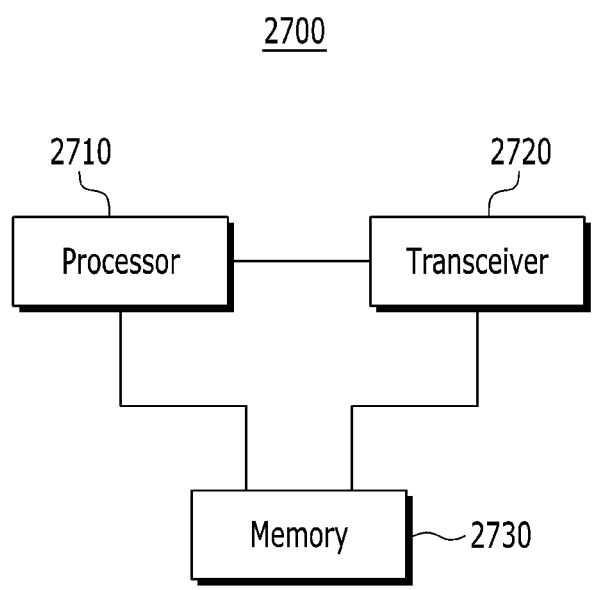
FIG. 27 is a diagram illustrating an apparatus for operating a system according to an exemplary embodiment of the present invention.

FIG. 27 is a diagram illustrating an apparatus for operating a system according to an exemplary embodiment of the present invention.

Referring to FIG. 27, the system operating apparatus 2700 includes a processor 2710, a transceiver 2720, and a memory 2730. The system operating apparatus 2700 may be included in a base station using a millimeter-wave based ultra band or may be the base station itself.

The processor 2710 performs the functions corresponding to the system operating method described based on FIGS. 3 to 12. The terminal may perform the beam switching, the handover, and the RLF recovery based on the system operating method. The processor 2710 may support the beam switching, the handover, and the RLF recovery of the terminal.

The transceiver 2720 transceives traffic, a message, and a control signal with the terminal or an adjacent base station.

The memory 2730 stores the information required for operating the system based on FIGS. 3 to 12. The memory 2730 may store the information required for supporting the beam switching, the handover, and the RLF recovery of the terminal.

Further, the memory 2730 stores instructions for execution in the processor 2710, loads instructions from a storage device (not illustrated), or temporarily stores the instructions, and the processor 2710 executes the instructions stored in or loaded to the memory 2730.

The processor 2710 and the memory 2730 may be connected to each other through a bus (not illustrated), and an input/output interface (not illustrated) may be connected to the bus. In this case, the transceiver 2720 may be connected to the input/output interface, and peripheral devices such as an input device, a display, a speaker, a storage device, and the like may be connected to the input/output interface.

According to exemplary embodiments of the present invention, a base station using a millimeter wave based ultra band can effectively manage a radio resource.

The exemplary embodiments of the present invention are not embodied only by the apparatus and/or the method described above, and the above-mentioned exemplary embodiments may be embodied by a program performing functions which correspond to the configuration of the exemplary embodiments of the present invention or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for operating a system in a base station that operates an ultra wideband as a frequency resource, including a plurality of antenna assemblies in a mobile communication system, the method comprising:
   dividing an ultra wideband into a plurality of unit-bands (UBs);
   forming a plurality of spot beams by the plurality of antenna assemblies;
   grouping a plurality of beam component carriers (BBCs) distinguished by the plurality of UBs into BBCs that belong to the same UB with respect to each spot beam to operate the grouped BBCs as a plurality of cells;
   configuring one cell among the plurality of cells to support movement of a terminal; and
   allocating the frequency resource of a data domain for the same UB at the same time for a plurality of terminals by pairing the cells based on cells that do not interfere with each other and allocating the same resource to the paired cells to transmit different information to the data domain among the paired cells.

2. The method of claim 1, wherein
   the allocating includes
   estimating interference based on feedback information from the plurality of terminals and,
   pairing BBCs in which the interference does not occur, and
   the feedback information includes information on a reference signal of a detected BBC.

3. The method of claim 1, wherein
   the configuring includes
   transmitting a common reference signal through the plurality of BBCs constituting each cell, and
   supporting a cell handover, when cell handover is determined based on an average value of a received strength measured from the common reference signal by the terminal.

4. The method of claim 1, wherein
   the configuring includes
   transmitting unique reference signals from the plurality of BBCs constituting each cell, respectively, and
   supporting a beam switching, when beam switching is determined based on the received strength of the reference signal by the terminal.

5. The method of claim 1, further comprising:
   transmitting measurement control information associated with beam tracking to the terminal through system information of a cell in which the terminal resides when the terminal is in an idle state; and
   transmitting the measurement control information through a dedicated channel of an accessed cell when the terminal is in an accessed state,
   wherein the cell handover or the beam switching is determined by the terminal based on the beam tracking.

6. The method of claim 1, wherein
   the configuring includes aggregating residual BBCs other than a BBC of a cell for movement of the terminal among a plurality of BBCs in a beam in which the terminal resides.

7. The method of claim 1, wherein
   the cell for the movement of the terminal is a cell of the same UB as a neighboring base station or a cell of a different UB from the neighboring base station.

8. The method of claim 1, wherein
   the configuring includes executing advanced resource preparation of at least one neighboring beam corresponding to 1 tier around a beam which the terminal currently accesses in the configured cell.

9. The method of claim 8, wherein
   the configuring further includes
   changing, by the terminal, a radio access link from a serving beam of the configured cell to a target beam,
   performing resource release of beams of which advanced resource preparation is not required among beams of which advanced resource preparation is made, and
   executing the advanced resource preparation of new beams of which advanced resource preparation is required.

10. The method of claim 9, wherein
    the changing includes recovering, by the terminal, a failure of the radio access link to the target beam when the failure is detected in the radio access link with the serving beam.

11. The method of claim 10, wherein
    the recovering includes requesting and receiving context information of the terminal from the neighboring base station when there is no context information of the terminal.

12. The method of claim 9, wherein
    the target beam is a beam controlled by a base station controlling the serving beam or includes a beam controlled by a base station different from the base station controlling the serving beam.

13. The method of claim 9, wherein
    the target beam is the serving beam or includes a different beam from the serving beam.

14. The method of claim 8, wherein
    the configuring further includes transmitting advanced resource preparation information of at least one neighboring beam to the terminal.

15. An apparatus for operating a system in a base station that operates an ultra wideband as a frequency resource, including a plurality of beam in a mobile communication system, the apparatus comprising:
    a processor dividing an ultra wideband into a plurality of unit-bands (UBs), forming a plurality of spot beams by the plurality of antenna assemblies;
    grouping a plurality of beam component carriers (BBCs) distinguished by the plurality of UBs into BBCs, that belong to the same UB with respect to each spot beam to operate the grouped BBCs as a plurality of cells;
    allocating the frequency resource of a data domain for the same UB at the same time for a plurality of terminals by pairing the cells based on cells that do not interfere with each other and allocating the same resource to the paired cells to transmit different information to the data domain among the paired cells; and a transceiver transceiving signaling for the movement of the terminal with the terminal or an adjacent base station.

16. The apparatus of claim 15, wherein the processor aggregates and operates residual BCCs other than a BCC of a cell for movement of the terminal among a plurality of BCCs in a beam in which the terminal resides.

17. The apparatus of claim 15, wherein the processor executes advanced resource preparation of at least one neighboring beam corresponding to 1 tier around a beam which the terminal currently accesses in the configured cell, and when the terminal changes a radio access link from a serving beam to a target beam, the processor performs resource release of beams of which advanced resource preparation is not required among beams of which advanced resource preparation is made, and executes the advanced resource preparation of new beams of which advanced resource preparation is required.

18. The apparatus of claim 15, wherein the transceiver receives a context information request of the terminal from the neighboring base station, and the processor verifies context information of the corresponding terminal and transmits the context information of the corresponding terminal through the transceiver.

* * * * *